US012647231B2

(12) United States Patent
Vassilovski et al.

(10) Patent No.: US 12,647,231 B2
(45) Date of Patent: Jun. 2, 2026

(54) SIDELINK-BASED RANGING AND POSITIONING UTILIZING POSITIONING REFERENCE SIGNAL (PRS) MESSAGES

(71) Applicant: QUALCOMM Incorporated, San Diego, CA (US)

(72) Inventors: Dan Vassilovski, Del Mar, CA (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 17/220,728

(22) Filed: Apr. 1, 2021

(65) Prior Publication Data

US 2022/0317278 A1 Oct. 6, 2022

(51) Int. Cl.
| | |
|---|---|
| *H04L 5/00* | (2006.01) |
| *H04W 8/24* | (2009.01) |
| *H04W 64/00* | (2009.01) |

(52) U.S. Cl.
CPC .......... H04L 5/0051 (2013.01); H04L 5/0048 (2013.01); H04W 8/24 (2013.01); H04W 64/006 (2013.01)

(58) Field of Classification Search
CPC ... G01S 13/765; G01S 13/767; H04L 5/0048; H04W 8/24; H04W 92/18
See application file for complete search history.

(56) References Cited

U.S. PATENT DOCUMENTS

2019/0297489 A1 9/2019 Lei et al.
2020/0028648 A1 1/2020 Akkarakaran et al.
2021/0058889 A1 2/2021 Zhang et al.
2022/0416976 A1* 12/2022 Baek ..................... H04W 72/51
2023/0254838 A1* 8/2023 Kim ..................... H04W 16/28
370/329

(Continued)

FOREIGN PATENT DOCUMENTS

JP 2011045038 A 3/2011
JP 2020532207 A 11/2020

(Continued)

OTHER PUBLICATIONS

International Search Report and Written Opinion—PCT/US2022/014144—ISA/EPO—May 12, 2022.
Taiwan Search Report—TW111103718—TIPO—Apr. 17, 2025.

*Primary Examiner* — Pakee Fang

(74) *Attorney, Agent, or Firm* — Thien T. Nguyen

(57) ABSTRACT

A UE transmits, to at least one UE, a PRS request message, the transmitted PRS request message including one or more parameters including at least one of: an SL ranging protocol version, one or more supported PRS channels, a supported per-channel PRS bandwidth, an initiator UE-assigned PRS Tx time, or a post-PRS Tx time. The UE receives, from the at least one UE, a PRS response message based on the transmitted PRS request message. The UE transmits, to the at least one UE, a PRS confirmation message based on the received PRS response message, the transmitted PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

30 Claims, 18 Drawing Sheets

(56)      References Cited

U.S. PATENT DOCUMENTS

| | | | | |
|---|---|---|---|---|
| 2023/0309042 A1* | 9/2023 | Da | .......................... | G01S 5/0236 |
| 2023/0319761 A1* | 10/2023 | Baek | ...................... | H04L 5/0051 |
| | | | | 455/456.1 |

FOREIGN PATENT DOCUMENTS

| | | | |
|---|---|---|---|
| TW | 202106057 | A | 2/2021 |
| WO | 2020066103 | A1 | 4/2020 |
| WO | 2020246842 | A1 | 12/2020 |
| WO | 2021010606 | A1 | 1/2021 |
| WO | 2021027861 | A1 | 2/2021 |
| WO | 2021045565 | A1 | 3/2021 |

* cited by examiner

TRP 402 / 406

RTT 414

UL-SRS 412

DL-PRS 410

ρ

DL-PRS resources

A resource set of DL-PRS 416

UE 404

TRP 402 / 408

θ'

Φ'

θ

Φ

Φ = Azimuth angle of departure (AoD)

θ = Zenith angle of departure (ZOD)

ρ, (θ', Φ') = distance and angles of arrival in polar coordinates

400

1100A

1100B

Figure 14:
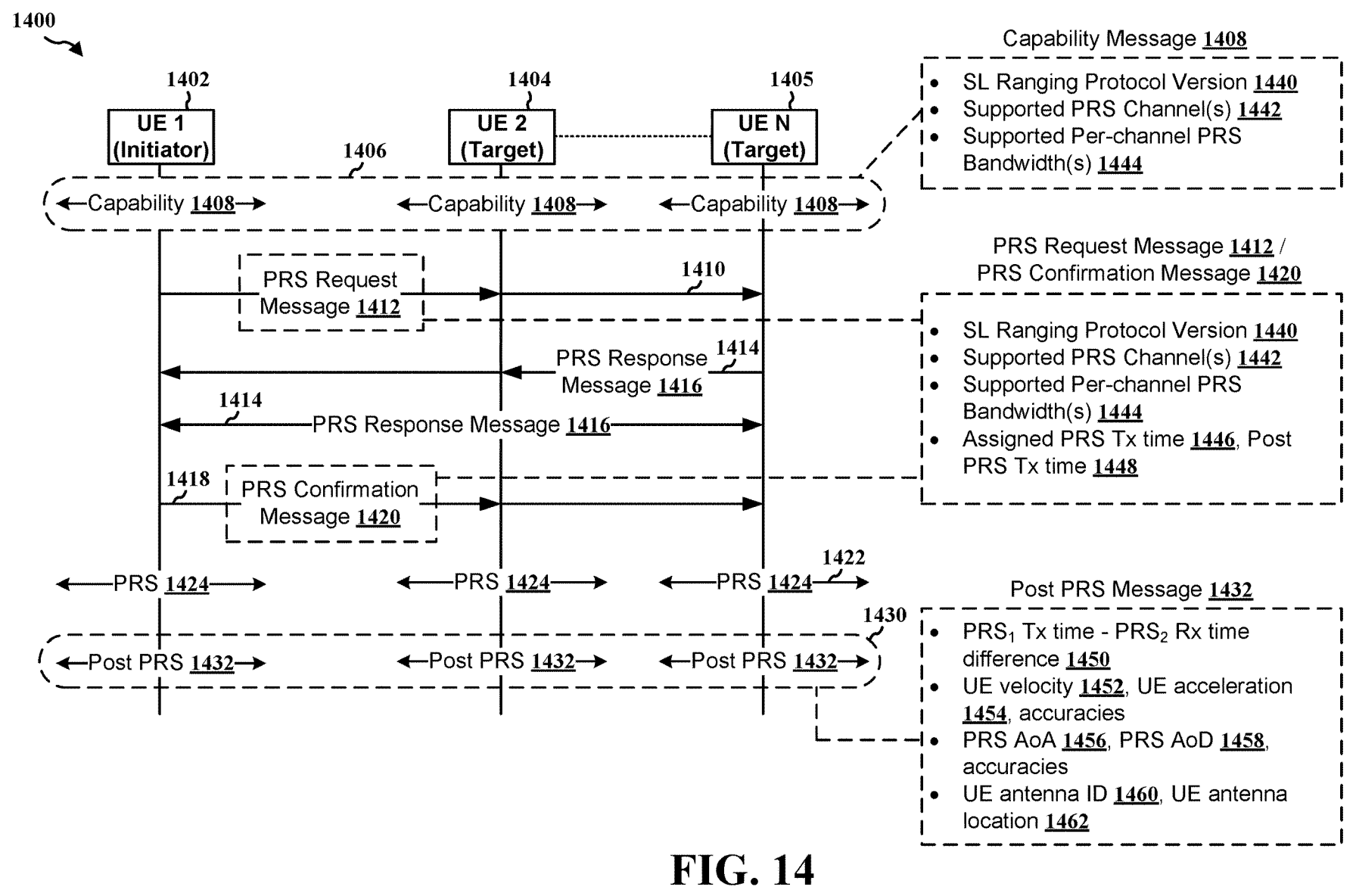

Capability Message 1408
- SL Ranging Protocol Version 1440
- Supported PRS Channel(s) 1442
- Supported Per-channel PRS Bandwidth(s) 1444

PRS Request Message 1412 / PRS Confirmation Message 1420
- SL Ranging Protocol Version 1440
- Supported PRS Channel(s) 1442
- Supported Per-channel PRS Bandwidth(s) 1444
- Assigned PRS Tx time 1446, Post PRS Tx time 1448

Post PRS Message 1432
- PRS$_1$ Tx time - PRS$_2$ Rx time difference 1450
- UE velocity 1452, UE acceleration 1454, accuracies
- PRS AoA 1456, PRS AoD 1458, accuracies
- UE antenna ID 1460, UE antenna location 1462

UE 1 (Initiator) 1402

UE 2 (Target) 1404

UE N (Target) 1405

1406

Capability 1408   1410

PRS Request Message 1412   1414

PRS Response Message 1416

PRS Confirmation Message 1420   1418

PRS 1424   1422

Post PRS 1432   1430

Figure 15:
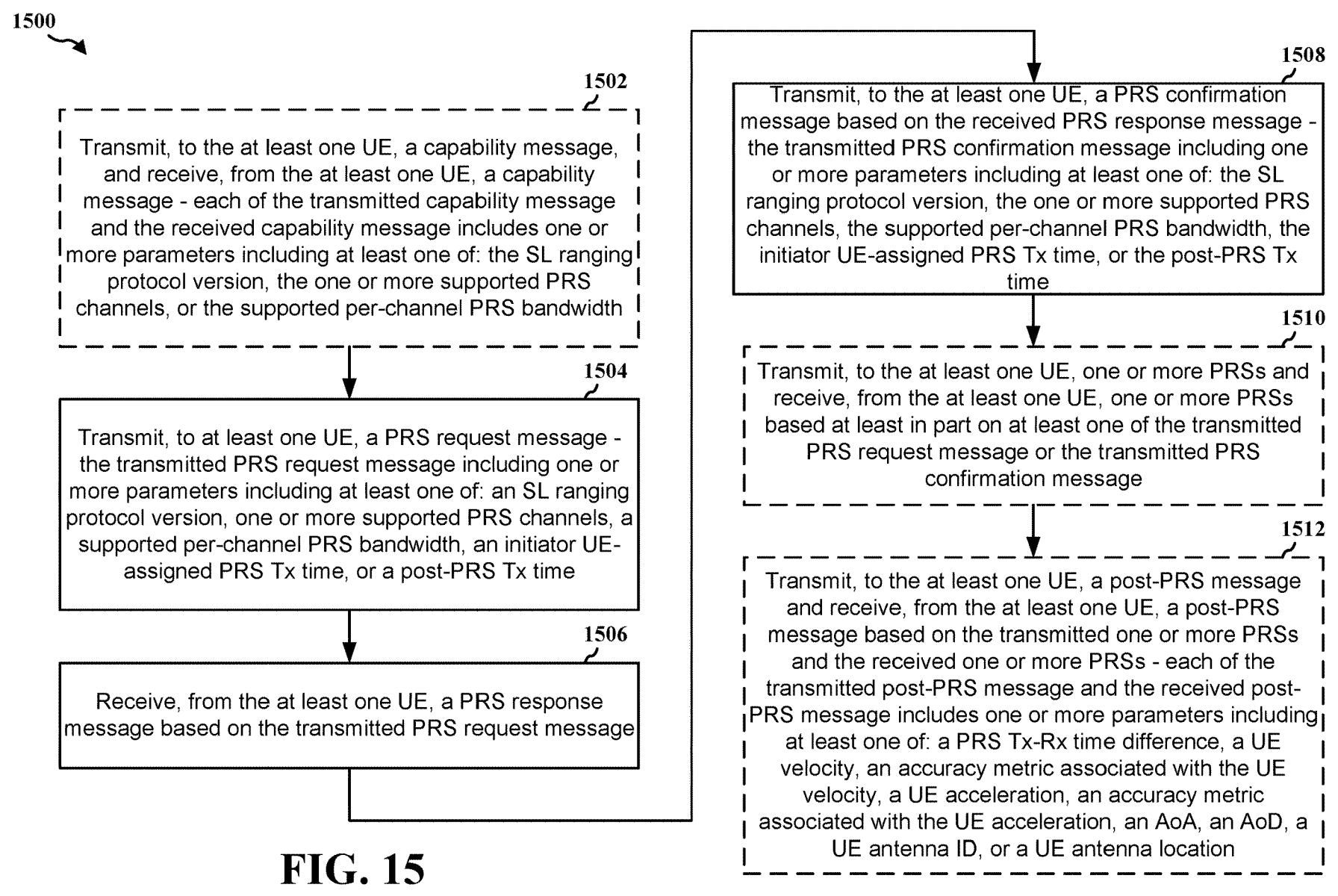

Transmit, to the at least one UE, a capability message, and receive, from the at least one UE, a capability message - each of the transmitted capability message and the received capability message includes one or more parameters including at least one of: the SL ranging protocol version, the one or more supported PRS channels, or the supported per-channel PRS bandwidth

1504

Transmit, to at least one UE, a PRS request message - the transmitted PRS request message including one or more parameters including at least one of: an SL ranging protocol version, one or more supported PRS channels, a supported per-channel PRS bandwidth, an initiator UE-assigned PRS Tx time, or a post-PRS Tx time

1506

Receive, from the at least one UE, a PRS response message based on the transmitted PRS request message

1508

Transmit, to the at least one UE, a PRS confirmation message based on the received PRS response message - the transmitted PRS confirmation message including one or more parameters including at least one of: the SL ranging protocol version, the one or more supported PRS channels, the supported per-channel PRS bandwidth, the initiator UE-assigned PRS Tx time, or the post-PRS Tx time

1510

Transmit, to the at least one UE, one or more PRSs and receive, from the at least one UE, one or more PRSs based at least in part on at least one of the transmitted PRS request message or the transmitted PRS confirmation message

1512

Transmit, to the at least one UE, a post-PRS message and receive, from the at least one UE, a post-PRS message based on the transmitted one or more PRSs and the received one or more PRSs - each of the transmitted post-PRS message and the received post-PRS message includes one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location

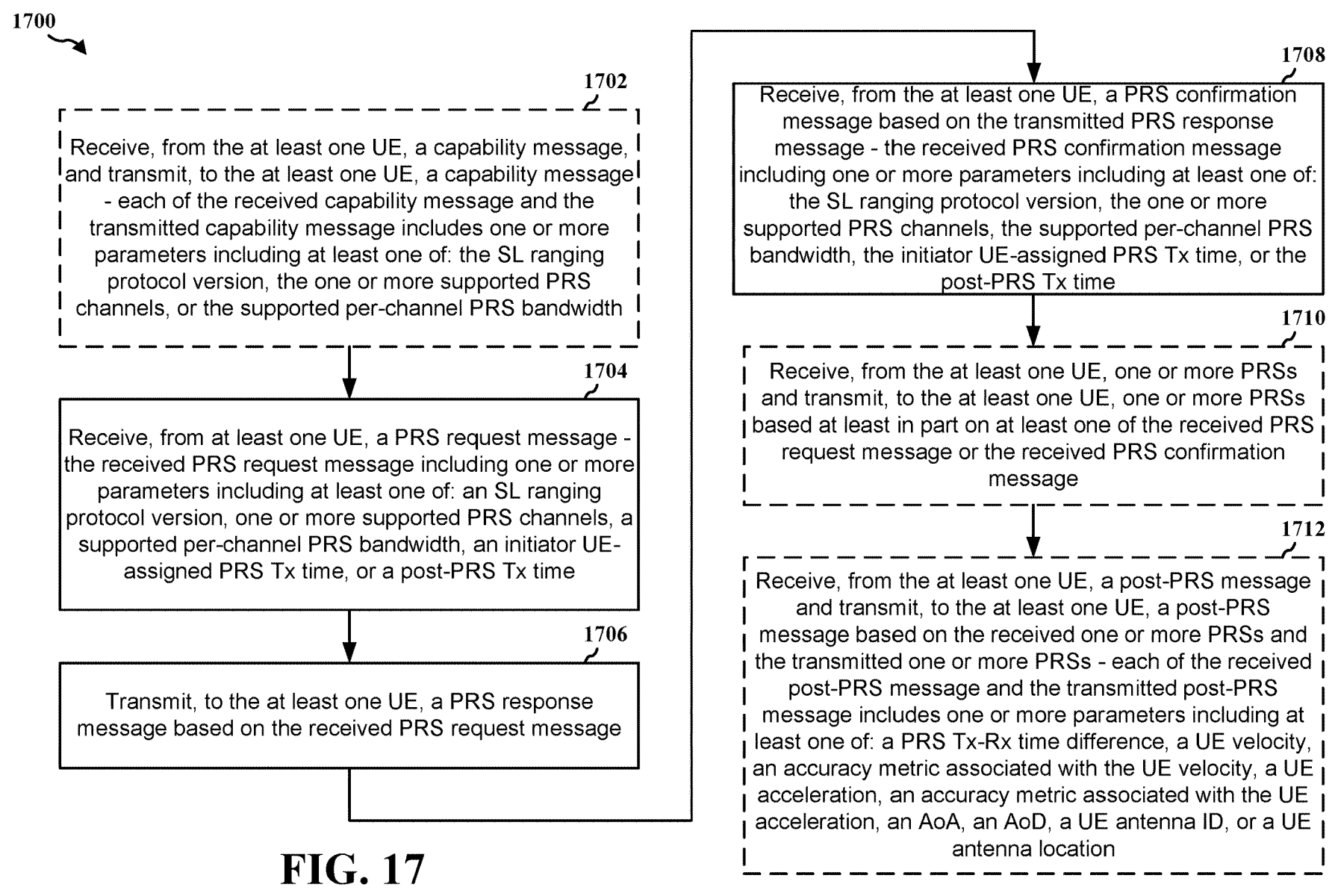

Receive, from the at least one UE, a capability message, and transmit, to the at least one UE, a capability message - each of the received capability message and the transmitted capability message includes one or more parameters including at least one of: the SL ranging protocol version, the one or more supported PRS channels, or the supported per-channel PRS bandwidth

1704

Receive, from at least one UE, a PRS request message - the received PRS request message including one or more parameters including at least one of: an SL ranging protocol version, one or more supported PRS channels, a supported per-channel PRS bandwidth, an initiator UE-assigned PRS Tx time, or a post-PRS Tx time

1706

Transmit, to the at least one UE, a PRS response message based on the received PRS request message

1708

Receive, from the at least one UE, a PRS confirmation message based on the transmitted PRS response message - the received PRS confirmation message including one or more parameters including at least one of: the SL ranging protocol version, the one or more supported PRS channels, the supported per-channel PRS bandwidth, the initiator UE-assigned PRS Tx time, or the post-PRS Tx time

1710

Receive, from the at least one UE, one or more PRSs and transmit, to the at least one UE, one or more PRSs based at least in part on at least one of the received PRS request message or the received PRS confirmation message

1712

Receive, from the at least one UE, a post-PRS message and transmit, to the at least one UE, a post-PRS message based on the received one or more PRSs and the transmitted one or more PRSs - each of the received post-PRS message and the transmitted post-PRS message includes one or more parameters including at least one of: a PRS Tx-Rx time difference, a UE velocity, a UE acceleration, an accuracy metric associated with the UE velocity, a UE acceleration, an accuracy metric associated with the UE acceleration, an AoA, an AoD, a UE antenna ID, or a UE antenna location

FIG. 17

SIDELINK-BASED RANGING AND POSITIONING UTILIZING POSITIONING REFERENCE SIGNAL (PRS) MESSAGES

TECHNICAL FIELD

The present disclosure relates generally to communication systems, and more particularly, to wireless communication involving ranging and positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus transmits, to at least one UE, a positioning reference signal (PRS) request message, the transmitted PRS request message including one or more parameters including at least one of: a sidelink (SL) ranging protocol version, one or more supported PRS channels, a supported per-channel PRS bandwidth, an initiator UE-assigned PRS transmission (Tx) time, or a post-PRS Tx time. The apparatus receives, from the at least one UE, a PRS response message based on the transmitted PRS request message. The apparatus transmits, to the at least one UE, a PRS confirmation message based on the received PRS response message, the transmitted PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

In an aspect of the disclosure, a method, a computer-readable medium, and an apparatus are provided for wireless communication at a UE. The apparatus receives, from at least one UE, a PRS request message, the received PRS request message including one or more parameters including at least one of: an SL ranging protocol version, one or more supported PRS channels, a supported per-channel PRS bandwidth, an initiator UE-assigned PRS Tx time, or a post-PRS Tx time. The apparatus transmits, to the at least one UE, a PRS response message based on the received PRS request message. The apparatus receives, from the at least one UE, a PRS confirmation message based on the transmitted PRS response message, the received PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a diagram illustrating an example of an SL-based ranging and positioning between N participating UEs according to aspects of the present disclosure.

FIG. 15 is a flowchart of a method of wireless communication in accordance with aspects presented herein.

FIG. 17 is a flowchart of a method of wireless communication in accordance with aspects presented herein.

DETAILED DESCRIPTION

Figure 1:
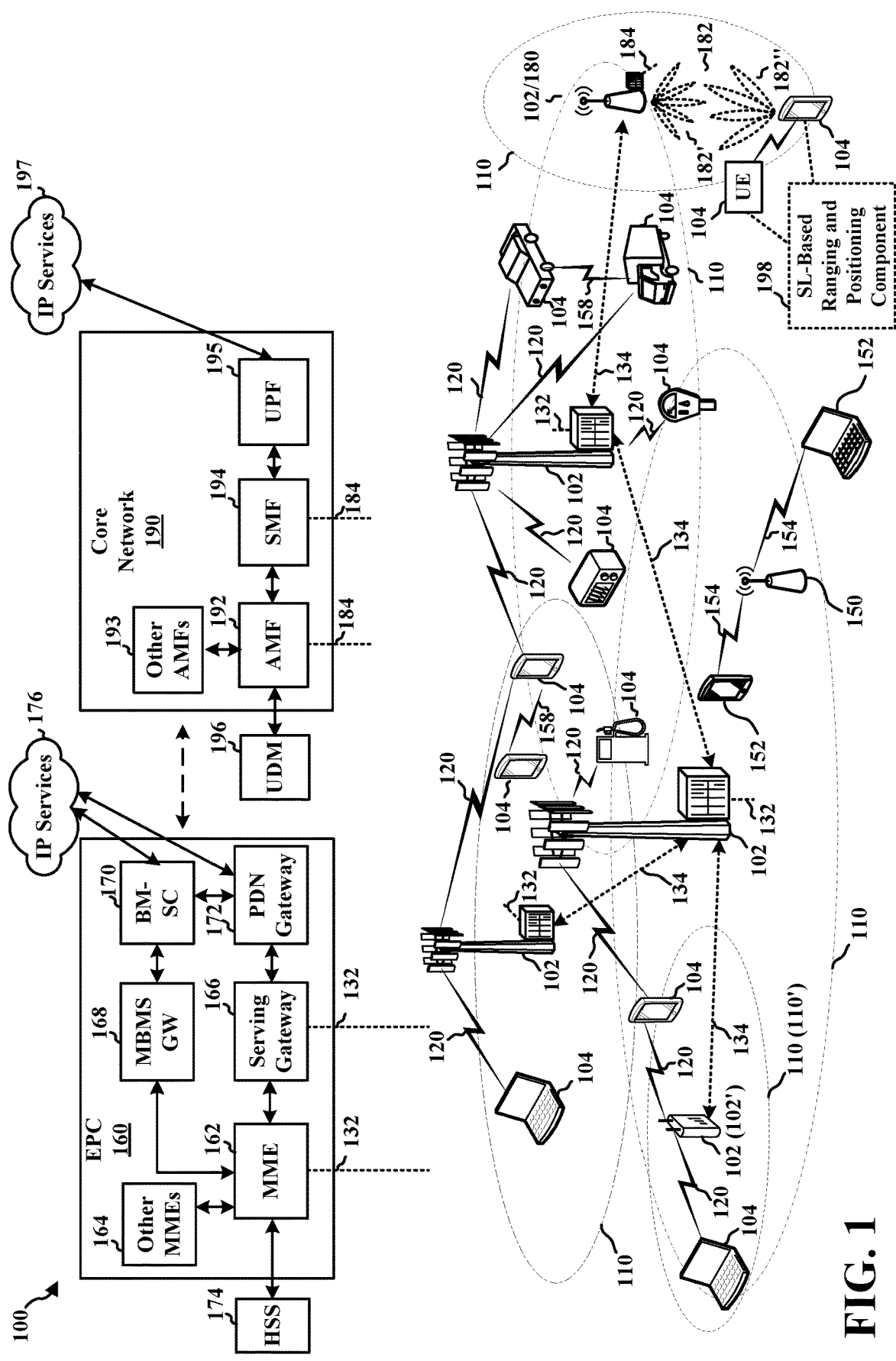
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the efficiency and performance of SL-based ranging and/or positioning for one or more UEs. Aspects presented herein may reduce signaling overhead for one or more messages exchanged during an SL-based ranging and/or positioning session (e.g., the PRS request message, the PRS response message, the PRS conformation message, and/or the post PRS message, etc.), such that UEs may exchange the messages more efficiently using less resources. Aspects presented herein may also provide additional message elements to expand the scenarios in which the SL-based ranging and/or positioning may be applied to, such that UEs may communicate with each other in a more effective manner during an SL-based ranging and/or positioning session.

In certain aspects, the UE 104 may include an SL-based ranging and positioning component 198 configured to establish one or more SL-based ranging and positioning sessions with one or more UEs. In one configuration, the SL-based ranging and positioning component 198 may be configured to transmit, to at least one UE, a PRS request message, the transmitted PRS request message may include one or more parameters including at least one of: an SL ranging protocol version, one or more supported PRS channels, a supported per-channel PRS bandwidth, an initiator UE-assigned PRS Tx time, or a post-PRS Tx time. In such configuration, the SL-based ranging and positioning component 198 may receive, from the at least one UE, a PRS response message based on the transmitted PRS request message. In such configuration, the SL-based ranging and positioning component 198 may transmit, to the at least one UE, a PRS confirmation message based on the received PRS response message, the transmitted PRS confirmation message includes one or more parameters including at least one of: the SL ranging protocol version, the one or more supported PRS channels, the supported per-channel PRS bandwidth, the initiator UE-assigned PRS Tx time, or the post-PRS Tx time.

In another configuration, the SL-based ranging and positioning component 198 may be configured to receive, from at least one UE, a PRS request message, the received PRS request message includes one or more parameters including at least one of: an SL ranging protocol version, one or more supported PRS channels, a supported per-channel PRS bandwidth, an initiator UE-assigned PRS Tx time, or a post-PRS Tx time. In such configuration, the SL-based ranging and positioning component 198 may transmit, to the at least one UE, a PRS response message based on the received PRS request message. In such configuration, the SL-based ranging and positioning component 198 may receive, from the at least one UE, a PRS confirmation message based on the transmitted PRS response message, the received PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
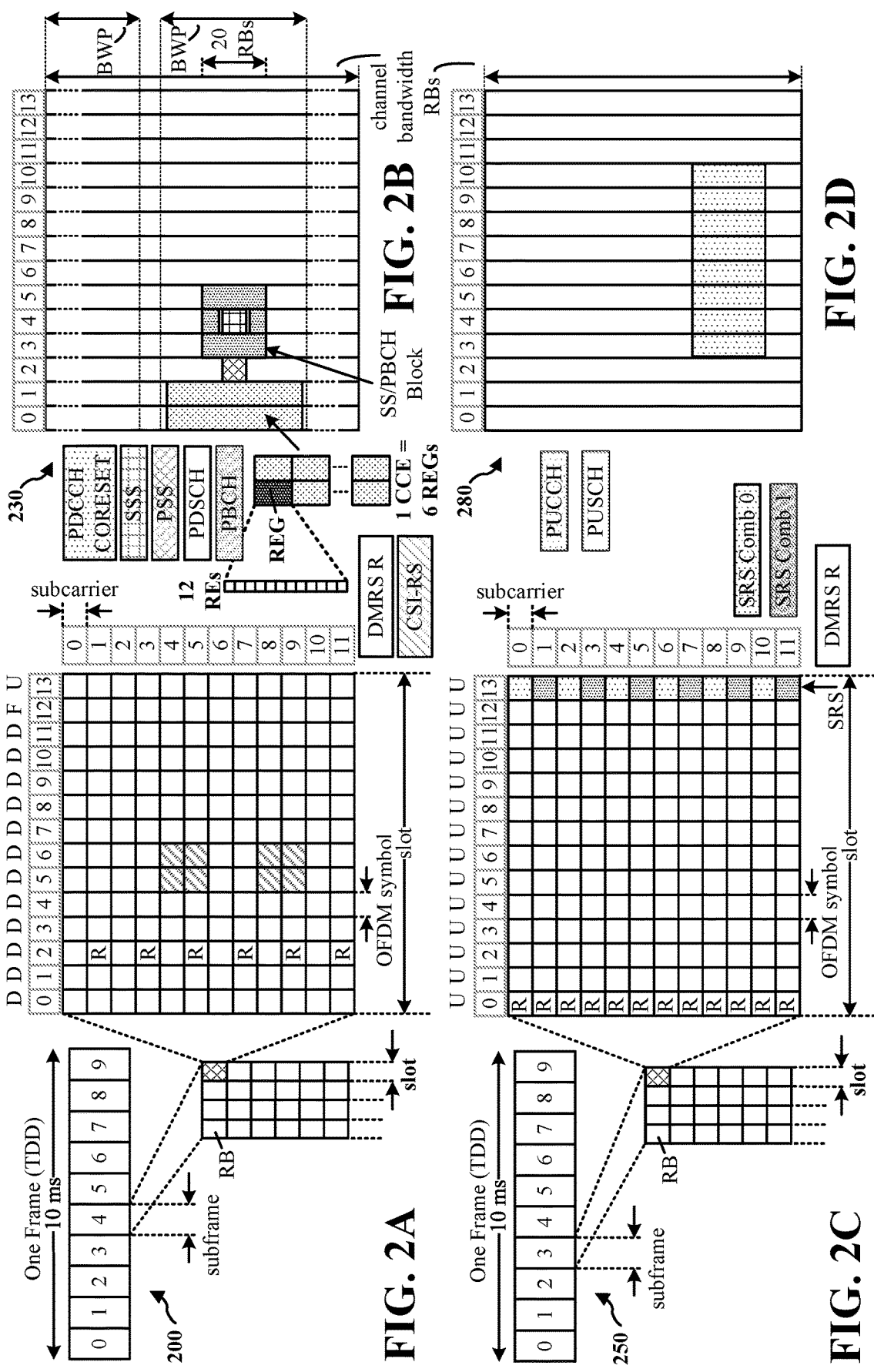
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
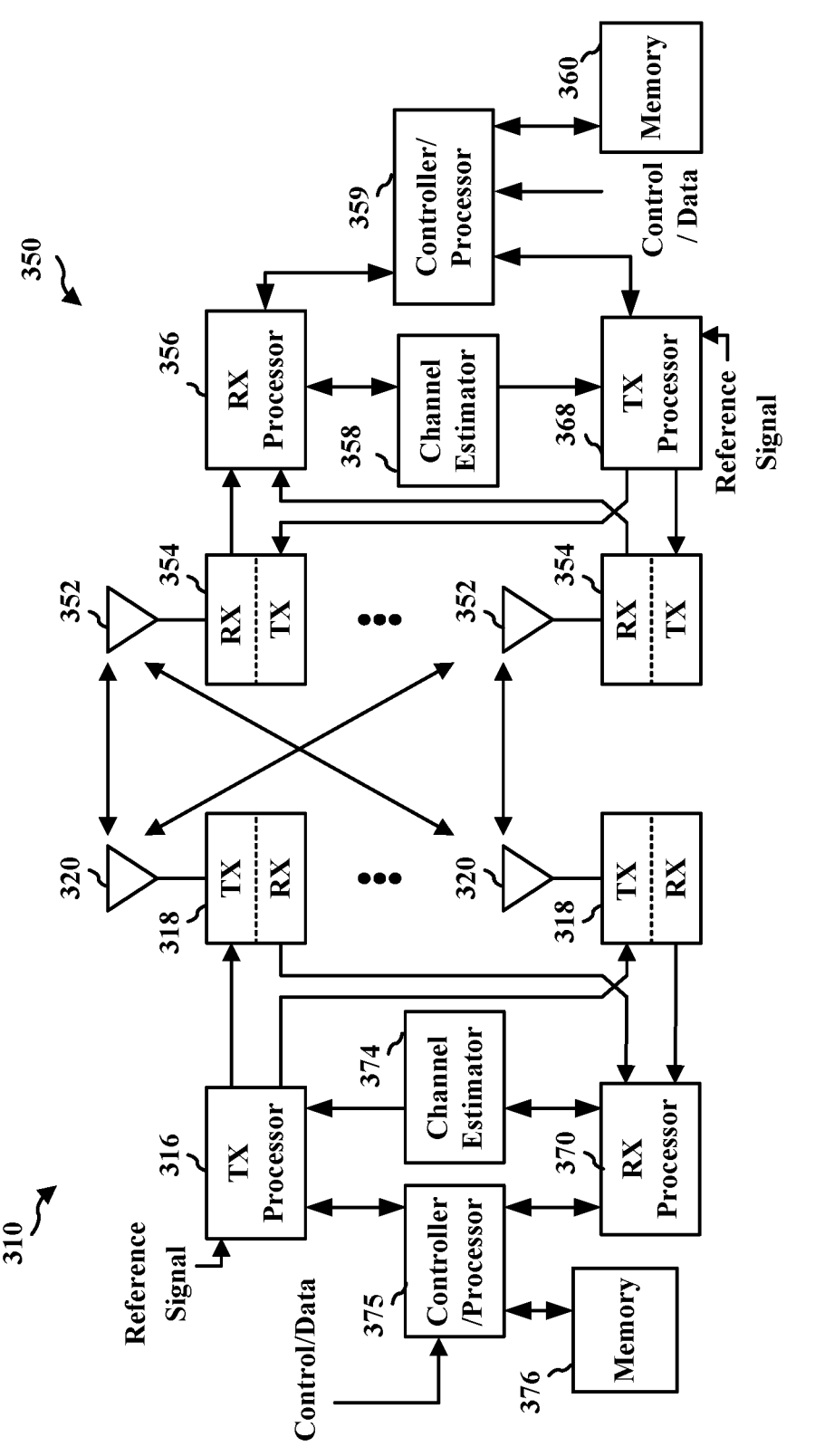
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SL-based ranging and positioning component 198 of FIG. 1.

Figure 4:
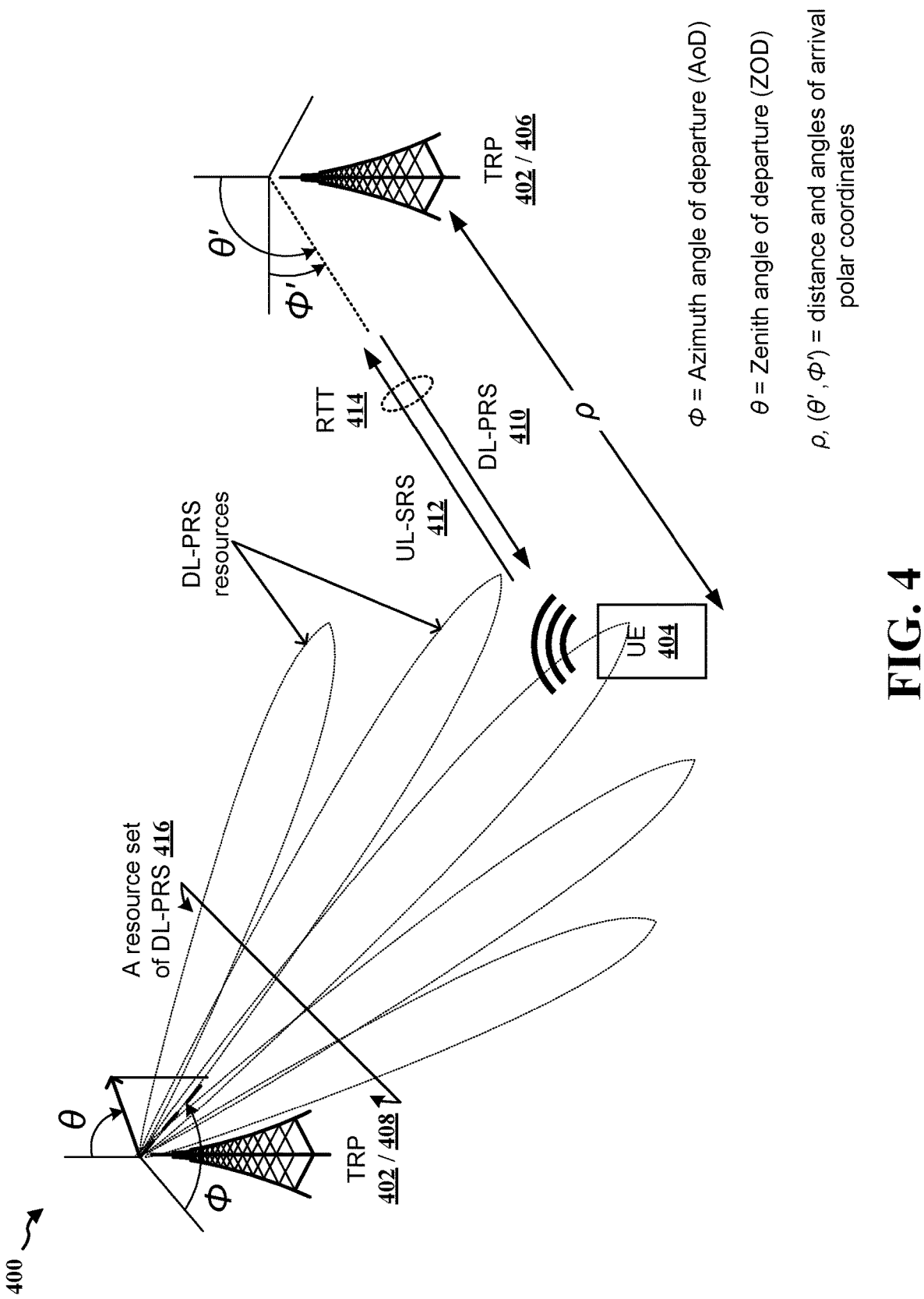
FIG. 4 is a diagram illustrating an example of a UE positioning based on reference signal measurements.

A UE's position may be estimated based on measuring reference signals transmitted between the UE and one or more base stations and/or transmission reception points (TRPs). FIG. 4 is a diagram 400 illustrating an example of a UE positioning based on reference signal measurements. In one example, a UE 404's location may be estimated based on multi-cell round trip time (multi-RTT) measurements, where multiple TRPs 402 may perform round trip time (RTT) measurements for signals transmitted to and received from the UE 404 to determine the UE 404's approximate distance with respect to each of the multiple TRPs 402. Similarly, the UE 404 may perform RTT measurements for signals transmitted to and received from the TRPs 402 to determine each TRP's approximate distance with respect to the UE 404. Then, based at least in part on the UE 404's approximate distances with the multiple TRPs 402, a base station and/or the UE 404 may estimate the UE 404's position. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, the TRP 406 may identify the UE 404's position (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 may identify the TRP 406's position with respect to the UE 404. The multi-RTT measurement mechanism may be initiated by a location management function (LMF) that is associated with a base station. A base station may configure UL-SRS resources to a UE via radio resource control (RRC) signaling. In some examples, the UE and the base station (e.g., TRPs of the base station) may report the multi-RTT measurements to the LMF, and the LMF may estimate the UE's position based on the reported multi-RTT measurements.

In other examples, a UE's position may be estimated based on multiple antenna beam measurements, where a downlink angle of departure (DL-AoD) and/or uplink angle of arrival (UL-AoA) of transmissions between a UE and one or more base stations/TRPs may be used to estimate the UE's position and/or the UE's distance with respect to each base station/TRP. For example, referring back to FIG. 4, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a base station (e.g., to the LMF associated with the base station). Based on the DL-PRS beam measurements, the base station may derive the azimuth angle (e.g., $\Phi$) of departure and the zenith angle (e.g., $\theta$) of departure for DL-PRS beams of the TRP 408. Then, the base station may estimate the UE 404's position with respect to the TRP 408 based on the azimuth angle of departure and the zenith angle of departure of the DL-PRS beams. Similarly, for the UL-AoA, a UE's position may be estimated based on UL-SRS beam measurements measured at different TRPs, such as at the TRPs 402. Based on the UL-SRS beam measurements, the base station may derive the azimuth angle of arrival and the zenith angle of arrival for UL-SRS beams from the UE, and the base station may estimate the UE's position and/or the UE distance with respect to each of the TRPs based on the azimuth angle of arrival and the zenith angle of arrival of the UL-SRS beams.

Figures 5A, 5B:
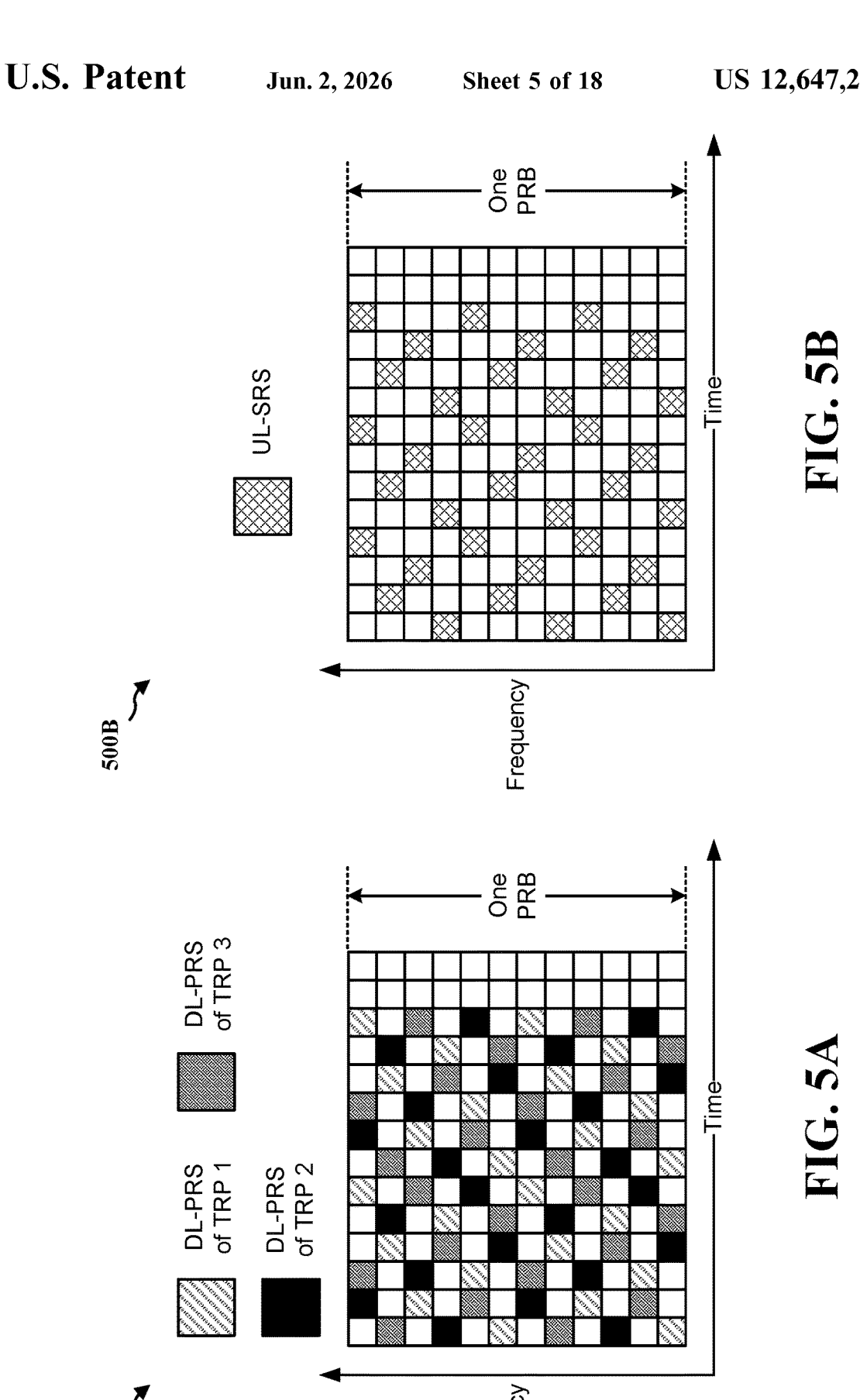
FIGS. 5A and 5B are diagrams illustrating examples of DL-PRS transmitted from multiple TRPs and UL-SRS transmitted from a UE.

FIG. 5A is a diagram 500A illustrating an example of DL-PRS transmitted from multiple TRPs. In one example, a base station may configure DL-PRS to be transmitted from one or more TRPs within a slot or across multiple slots. If the DL-PRS is configured to be transmitted within a slot, the base station may configure the starting resource element in time and frequency from each of the one or more TRPs. If the DL-PRS is configured to be transmitted across multiple slots, the base station may configure gaps between DL-PRS slots, periodicity of the DL-PRS, and/or density of the DL-PRS within a period. The base station also may configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPs and/or from different PRS beams may be multiplexed across symbols or slots. Each symbol of the DL-PRS may be configured with a comb-structure in frequency, where the DL-PRS from a base station or a TRP may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A is an example of a comb-6 DL-PRS configuration, where the pattern for the DL-PRS from different TRPs may be repeated after six (6) symbols.

FIG. 5B is a diagram 500B illustrating an example of UL-SRS transmitted from a UE. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a base station/TRP. In some examples, the SRS resources may span 1, 2, 4, 8, or 12 consecutive OFDM symbols. In other examples, the comb size for the UL-SRS may be configured to be 2, 4, or 8.

A UE's position and/or a UE's range with respect to another UE may also be determined/estimated based on sidelink (SL) communications. SL-based ranging and positioning may enable determination of a UE's relative distance and absolute position based on sidelink communications, which may provide the UE with alternative or additional ranging or positioning mechanisms when positioning based on global navigation satellite system (GNSS) is degraded or unavailable (e.g., in tunnels, urban canyons, etc.). In some examples, SL-based ranging and positioning may also enhance the ranging and/or the positioning accuracy when the GNSS is available. In one example, SL-based ranging and positioning for a UE may be accomplished using a three-way handshake for a session establishment between the UE and one or more peer UEs, followed by exchanging of PRSs between the UE and the one or more peer UEs, and concluded by exchanging measurements based on PRS transmission and reception via messaging between the UE and the one or more peer UEs.

Figure 6:
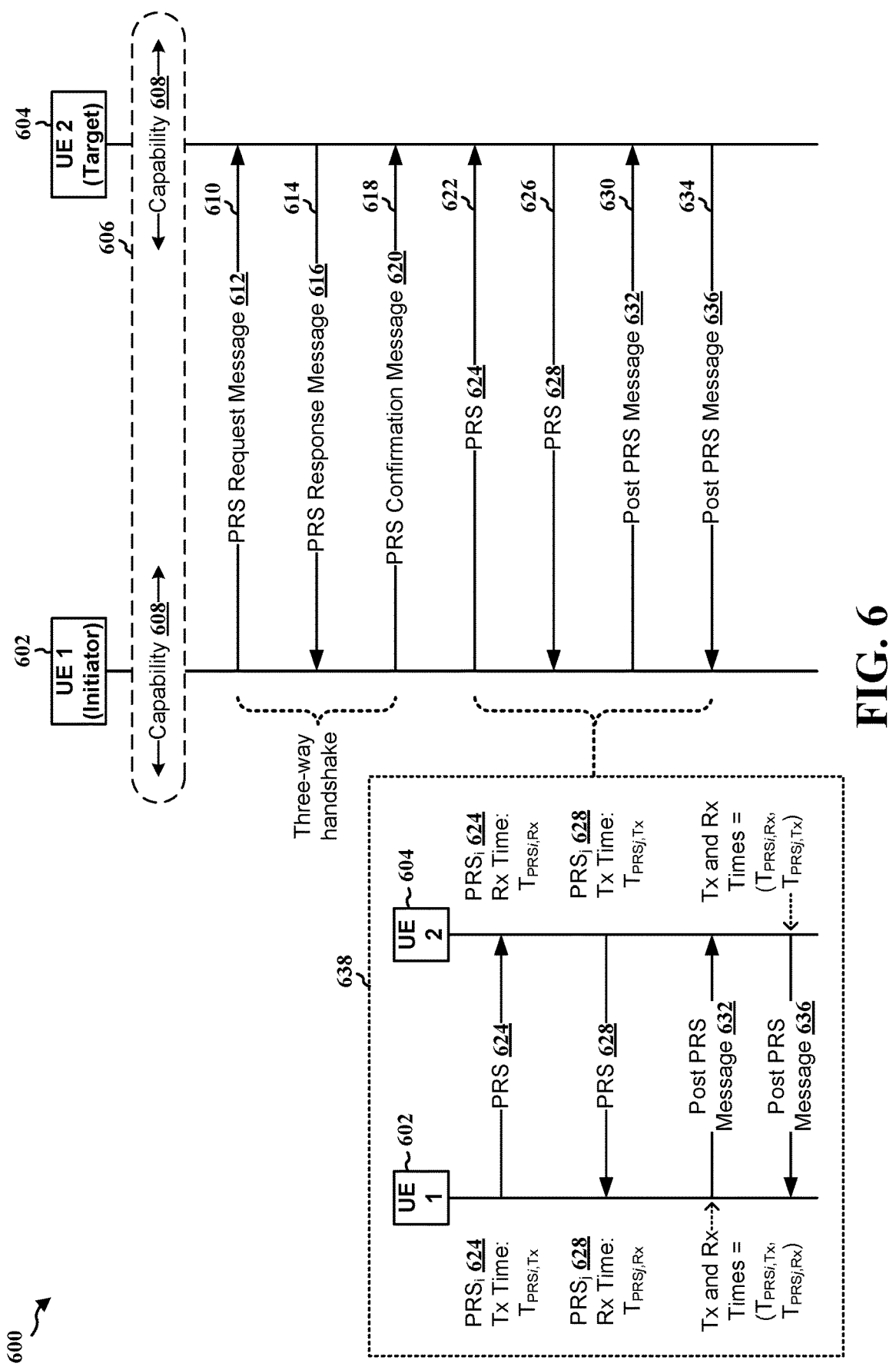
FIG. 6 is a diagram illustrating an example of an SL-based ranging and positioning session between two UEs.

FIG. 6 is a diagram 600 illustrating an example of an SL-based ranging and positioning session between two UEs. Optional aspects may be illustrated in dashed lines. An SL ranging between a first UE 602 (e.g., an initiator) and a second UE 604 (e.g., a target) may be determined based at least in part on calculating an inter-UE RTT between PRSs (e.g., wideband PRSs) transmitted from the first UE 602 to the second UE 604 and the PRSs transmitted from the second UE 604 to the first UE 602. Then, based on the transmission (Tx) and reception (Rx) times of PRSs between the first UE 602 and the second UE 604, the first UE 602 and/or the second UE 604 may be able to determine the RTT between the transmitted PRSs and the received PRSs.

In one example, as shown at 606, the first UE 602 and/or the second UE 604 may optionally exchange a capability message 608 with each other, where the capability message 608 from the first UE 602 and/or the second UE 604 may include information related to each UE's capability to perform an SL-ranging/positioning. Based at least in part on the exchanged capability messages 608, the first UE 602 may determine whether the second UE 604 is a candidate for performing the SL-ranging/positioning.

After the optional capability message 608 exchanging, the first UE 602 may initiate an SL-ranging/positioning session with the second UE 604 by establishing a three (3)-way handshake with the second UE 604. For example, at 610, the first UE 602 may transmit a PRS request message 612 (e.g., PRSrequest) to the second UE 604 for requesting the second UE 604 to transmit one or more PRSs to the first UE 602. At 614, in response to the PRS request message 612, the second UE 604 may transmit a PRS response message 616 to the first UE 602. For example, the PRS response message 616 may indicate whether the second UE 604 is able to grant the first UE 602's PRS request (e.g., the request for exchanging PRS). At 618, in response to the PRS response message 616, the first UE 602 may transmit a PRS confirmation message 620 to the second UE 604. For example, the PRS confirmation message 620 may confirm the PRS transmissions between the first UE 602 and the second UE 604. In other words, the three-way handshake initiated by the first UE 602 may include transmissions of the PRS request message 612, reception of the PRS response message 616, and transmission of the PRS confirmation message 620 at the first UE 602.

At 622, after the three-way handshake, the first UE 602 may transmit one or more PRSs 624 to the second UE 604. At 626, in response to the one or more PRSs 624, the second UE 604 may transmit one or more PRSs 628 to the first UE 602.

At 630, after receiving the one or more PRSs 626 from the second UE 604, the first UE 602 may measure the received one or more PRSs 626, such as the time in which the one or more PRSs 626 are received, and the first UE 602 may transmit information related to the measurement to the second UE 604 via a post PRS message 632. Similarly, at 634, the second UE 604 may measure the one or more PRSs 628, and the second UE 604 may transmit information related to the measurement to the first UE 604 via a post PRS message 636.

Based on a local measurement for the transmitted and the received PRSs (e.g., PRSs 624 and 628) and based on the measurement received from the other UE in the post PRS message (e.g., 632 or 636), the first UE 602 and/or the second UE 604 may be able to determine an RTT for the transmitted and the received PRSs.

In one example, as shown at 638, the first UE 602 and/or the second UE 604 may include two timestamps for the Tx time and the Rx time of the PRSs transmitted and received in its respective post PRS message. Then, the first UE 602 and/or the second UE 604 may determine the RTT for the PRSs transmitted and received based on the two timestamps received from the other UE. For example, the first UE 602 may include a transmission time for the one or more PRSs 624 (e.g., $T_{PRS_{i,Tx}}$) and a reception time for the one or more PRSs 628 (e.g., $T_{PRS_{j,Rx}}$) in the post PRS message 632, and the second UE 604 may include a reception time for the one or more PRSs 624 (e.g., $T_{PRS_{i,Rx}}$) and a transmission time for the one or more PRSs 628 (e.g., $T_{PRS_{j,Tx}}$) in the post PRS message 636. In other words, each UE may transmit its PRS Tx time and the Rx time for the PRS received from the peer UE in its post PRS message. Then, the RTT from the first UE 602 to the second UE 604 may be calculated by subtracting the respective Rx-Tx times of the PRSs for the first UE 602 and the second UE 604. For example, the RTT may be calculated based on the following equations:

$$RTT = \left(T_{PRS_{i,Rx}} - T_{PRS_{i,Tx}}\right) + \left(T_{PRS_{j,Rx}} - T_{PRS_{j,Tx}}\right),$$

$$RTT = \left(\begin{array}{c} PRS_i \text{ one way} \\ \text{time of flight} \end{array}\right) + \left(\begin{array}{c} PRS_j \text{ one way} \\ \text{time of flight} \end{array}\right).$$

Figure 7:
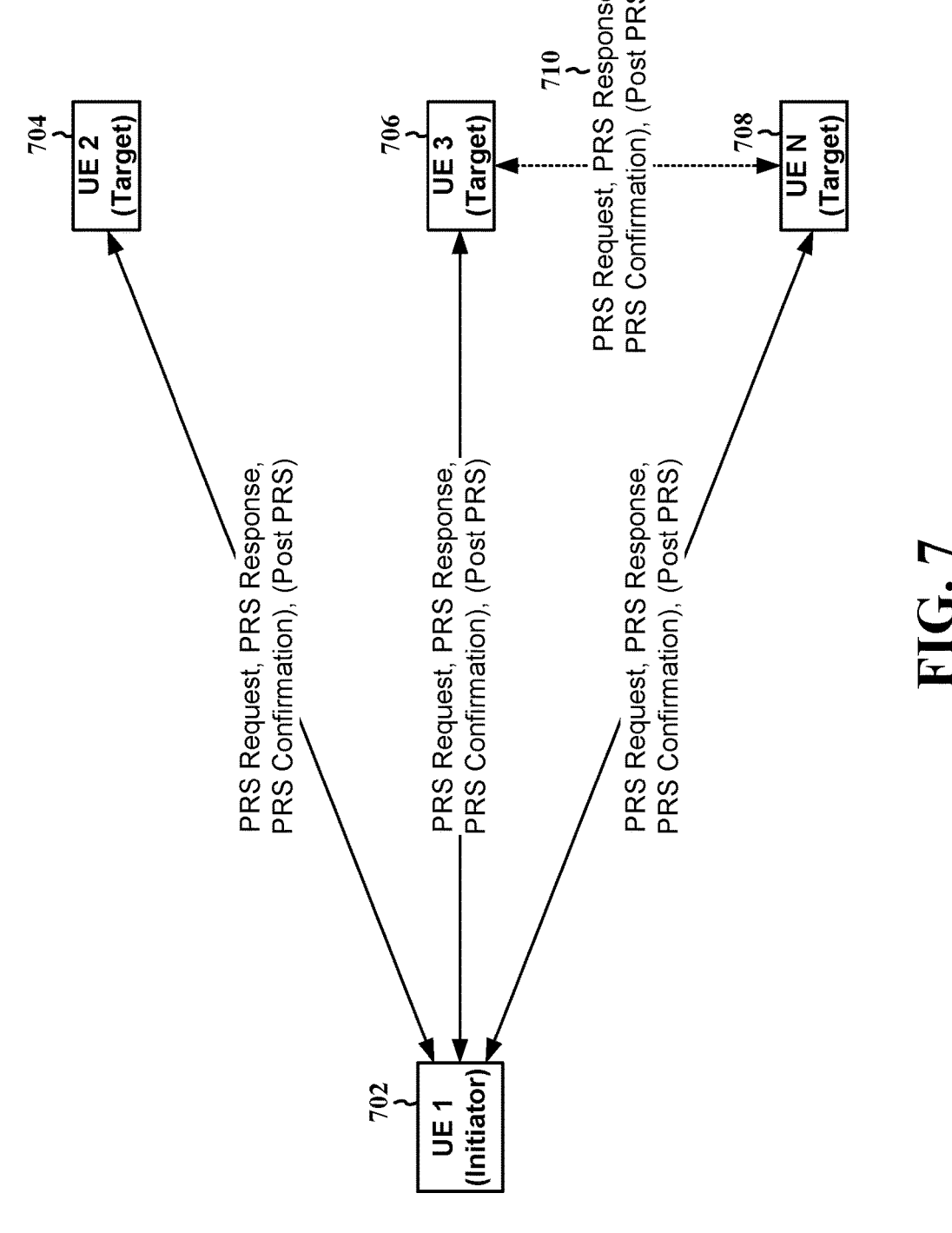
FIG. 7 is a diagram illustrating an example of SL-based ranging and positioning sessions between N participating UEs.

In some examples, the SL-based ranging and positioning described in connection with FIG. 6 may extend to multiple UEs, such as up to N participating UEs. FIG. 7 is a diagram 700 illustrating an example of SL-based ranging and positioning sessions between N participating UEs. Optional aspects may be illustrated in dashed lines. A first UE 702 (e.g., the first UE 602) may transmit a PRS request message (e.g., the PRS request message 612) to multiple target UEs, which may include a second UE 704, a third UE 706, and up to a $N^{th}$ UE 708. Then, the first UE 702 may receive a corresponding PRS response message (e.g., the PRS response message 616) from each of the second UE 704, third UE 706, and up to the $N^{th}$ UE 708. Based on the PRS response messages received, the first UE 702 may transmit a corresponding PRS confirmation message (e.g., the PRS confirmation message 620) to each of the second UE 704, third UE 706, and up to the $N^{th}$ UE 708. In other words, the first UE 702 may initiate and perform a three-way handshake with each of the multiple target UEs. Then, as described in connection with 622 and 626 of FIG. 6, the first UE 702 may exchange one or more PRSs with each of the multiple target UEs. For example, the first UE 702 may transmit one or more PRSs to the second UE 704 and receive one or more PRSs from the second UE 704; the first UE 702 may transmit one or more PRSs to the third UE 706 and receive one or more PRSs from the third UE 706; and the first UE 702 may transmit one or more PRSs to the $N^{th}$ UE 708 and receive one or more PRSs from the $N^{th}$ UE 708, etc.

Based on the exchanged PRSs between the first UE 702 and the multiple target UEs (e.g., the second UE 704, third UE 706, and up to the $N^{th}$ UE 708), as described in connection with 630, 634, and/or 638 of FIG. 6, the first UE 702 may measure the one or more PRSs received from each of the multiple target UEs, and the first UE 702 may transmit information related to the PRS measurements (e.g., the Rx time of the received PRSs and the Tx time of the transmitted PRSs) to each of the multiple target UEs in their corresponding post PRS messages, and the first UE 702 also may receive PRS measurements from each of the multiple target UEs from their post PRS messages. Based on the received PRS measurement, the first UE 702 and/or each of the multiple target UEs may determine an RTT between the first UE 702 and a corresponding target UE. For example, the first UE 702 and the second UE 704 may determine an RTT between them based on their exchanged PRS measurements, and the first UE 702 and the third UE 706 may determine an RTT between them based on their exchanged PRS measurements, etc.

In one example, as shown at 710, multiple target UEs may also initiate SL-based ranging and positioning sessions with each other. For example, the third UE 706 may also initiate an SL-based ranging and positioning session with the $N^{th}$ UE 708 by establishing a three-way handshake with the N$^{th}$ UE 708. Then, the third UE 706 and the N$^{th}$ UE 708 may exchange PRSs with each other, measure the PRSs received from each other, and transmit information related to the PRS measurements (e.g., the Rx time of the received PRSs and the Tx time of the transmitted PRSs) to each other. In some examples, the third UE 706 and/or the N$^{th}$ UE 708 may also transmit the PRS measurements to other participating UEs (e.g., other UEs in the N participating UEs), such as the first UE 702 and the second UE 704. In other words, each of the N participating UEs may establish an SL-based ranging and positioning session with each other (e.g., with each of the other UEs in the N participating UEs), and may transmit/ broadcast the PRSs measurements measured from the PRSs received from each other to other UEs in the N participating UEs via their corresponding post PRS messages. As such, each participating UE may transmit/broadcast N−1 PRS measurement results in the post PRS message to other participating UEs, and each participating UE may calculate or determine the RTTs between other participating UEs.

In one example, if a UE (e.g., the first UE 602, the second UE 604, the second UE 704, third UE 706, and/or up to the N$^{th}$ UE 708, etc.) knows its location, the UE may report the RTT measured between the UE and a participating UE to other participating UEs along with its location. In other words, one or more participating UEs may report an RTT measured to all other participating UEs along with their locations, if known. As such, for UEs having zero or inaccurate knowledge of their position, the determined RTTs described in connection with FIGS. 6 and 7 may enable the UEs to determine an inter-UE range between the UEs. On the other hand, for UEs having accurate knowledge of their position, the determined RTTs or the determined inter-UE range(s) may provide an absolute position for the UEs.

Aspects presented herein may improve the efficiency and performance of SL-based ranging and/or positioning. Aspects presented herein may reduce signaling overhead for one or more messages exchanged during an SL-based ranging and/or positioning session (e.g., the PRS request message, the PRS response message, the PRS conformation message, and/or the post PRS message, etc.), such that UEs may exchange the messages more efficiently using less resources. Aspects presented herein may also provide additional message elements to expand the scenarios to which the SL-based ranging and/or positioning may be applied, such that UEs may communicate with each other in a more effective manner during an SL-based ranging and/or positioning session.

In one aspect of the present disclosure, during an SL-based ranging and positioning session, a UE that is participating in the SL-based ranging and positioning session (e.g., an initiator UE, a target UE, the first UE 602, the second UE 604, the first UE 702, the second UE 704, etc.) may include an SL ranging protocol version used by the UE, one or more PRS channels supported by the UE, and/or one or more per-channel bandwidths supported by the UE in a capability message (e.g., the capability message 608).

In another aspect of the present disclosure, during the SL-based ranging and positioning session, a UE that is initiating the SL-based ranging and positioning session (e.g., the initiator UE, the first UE 602, the second UE 604, the first UE 702, the second UE 704, etc.) may include an SL ranging protocol version used by the UE, one or more PRS channels supported by the UE, one or more per-channel bandwidths supported by the UE, an assigned PRS Tx time and/or a post PRS Tx time in at least one of a PRS request message (e.g., the PRS request message 612) or a PRS confirmation message (e.g., the PRS confirmation message 620). In one example, the UE may include the SL ranging protocol version used by the UE, the one or more PRS channels supported by the UE, and/or the one or more per-channel bandwidths supported by the UE in at least one of the PRS request message or the PRS confirmation message if the UE initiated the SL-based ranging and positioning session without transmitting/exchanging a capability message with the target UE(s). However, if the UE has transmitted/exchanged a capability message with the target UE(s) prior to initiating the SL-based ranging and positioning session, and the capability message has included the SL ranging protocol version used by the UE, the one or more PRS channels supported by the UE, and/or the one or more per-channel bandwidths supported by the UE, the UE may skip including (e.g., may exclude) the SL ranging protocol version used by the UE, the one or more PRS channels supported by the UE, and/or the one or more per-channel bandwidths supported by the UE in the PRS request message and/or the PRS confirmation message.

In another aspect of the present disclosure, during the SL-based ranging and positioning session, a UE that is participating in the SL-based ranging and positioning session (e.g., the initiator UE, the target UE, the first UE 602, the second UE 604, the first UE 702, the second UE 704, etc.) may also include a PRS transmission-reception (Tx-Rx) time difference, a UE velocity and optionally the associated accuracy (e.g., an accuracy metric associated with the UE velocity), a UE acceleration and optionally the associated accuracy, an angle-of-arrival (AoA) of PRS and optionally the associated accuracy, an angle-of-departure (AoD) of PRS and optionally the associated accuracy, a UE antenna identifier (ID), and/or a UE antenna location in a post PRS message (e.g., the post PRS message 632 and/or the post PRS message 636).

Figure 8:
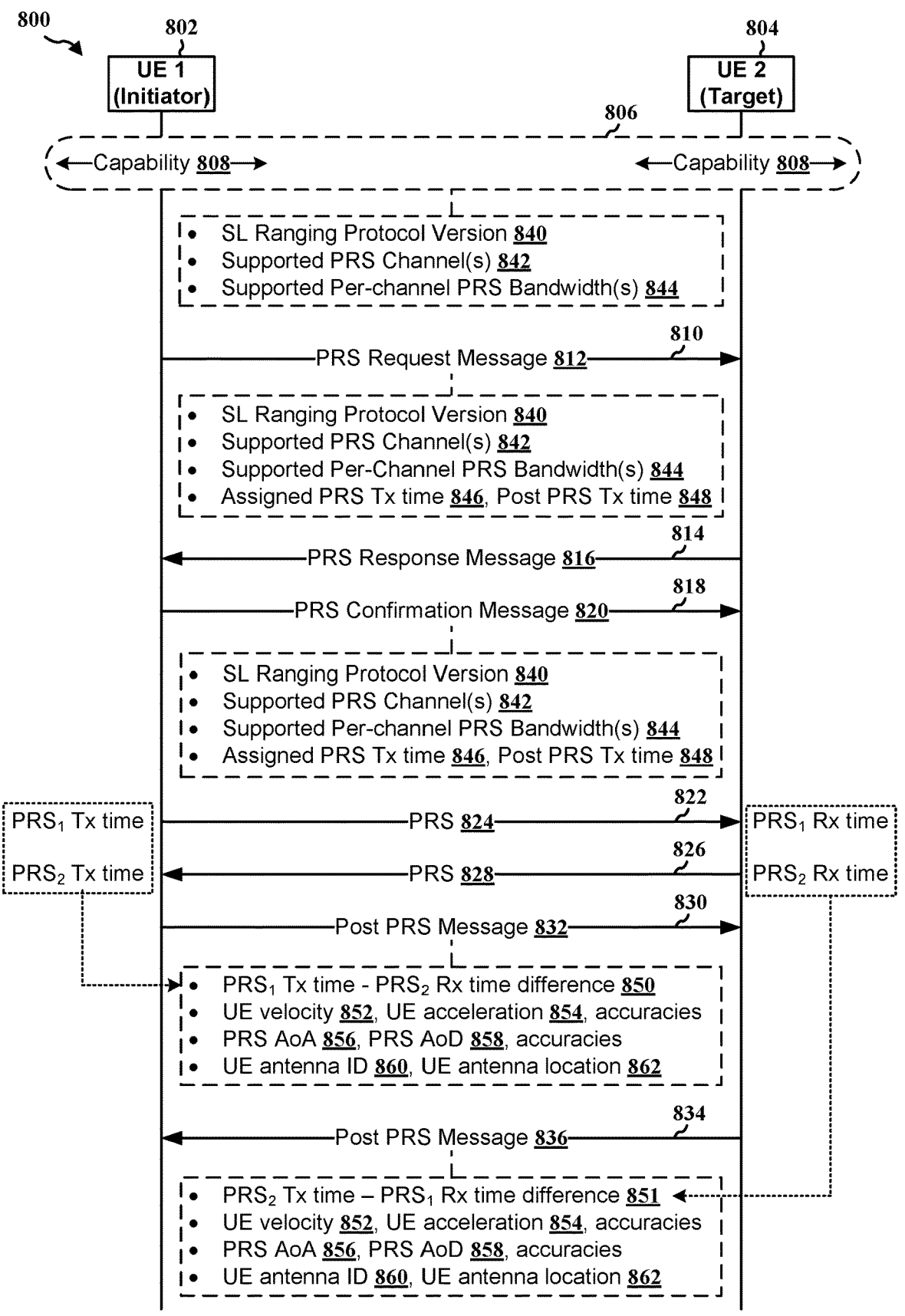
FIG. 8 is a communication flow illustrating an example of an SL-based ranging and positioning session between an initiator UE and a target UE according to aspects of the present disclosure.

FIG. 8 is a communication flow 800 illustrating an example of an SL-based ranging and positioning session between an initiator UE and a target UE according to aspects of the present disclosure. Optional aspects may be illustrated in dashed lines. Aspects presented herein provide additional message elements to one or more messages exchanged during an SL-based ranging and/or positioning session, such that the efficiency and the performance of the SL-based ranging and/or positioning may be improved.

At 806, a first UE 802 (e.g., an initiator UE, the first UE 602, the first UE 702, etc.) may transmit/exchange a capability message 808 with a second UE 804 (e.g., a target UE, the second UE 604, the second UE 704, etc.), where the capability message 808 may include at least information related to each UE's capability to perform an SL-based ranging/positioning. For example, the capability message 808 transmitted/broadcasted by the first UE 802 may include at least one of an SL ranging protocol version 840 that is used or supported by the first UE 802, one or more supported PRS channels 842 for the first UE 802, and/or one or more supported per-channel PRS bandwidths 844 for the first UE 802. The one or more supported PRS channels 842 may indicate the channel(s) in which the first UE 802 may transmit and/or receive PRS with another UE. The one or more supported per-channel PRS bandwidths 844 may indicate a PRS bandwidth (e.g., a maximum bandwidth) in which the first UE 802 may support for a channel. Based at least in part on the capability messages 808 received from the second UE 804, the first UE 802 may determine whether the second UE 804 is a candidate for performing the SL-based ranging and positioning (e.g., whether to perform the SL-based ranging and positioning with the second UE 804), and/or the SL ranging protocol version to be used with the second UE 804, etc. In some examples, the transmission/ exchange of the capability message 808 may be optional for the first UE 802 and/or the second UE 804.

After the capability message 808 exchanging, which may be optional, the first UE 802 may initiate an SL-based ranging and positioning session with the second UE 804 by establishing a three (3)-way handshake with the second UE 804, such as described in connection with FIG. 6. For example, at 810, the first UE 802 may transmit a PRS request message 812 to the second UE 804 for requesting the second UE 804 to exchange one or more PRSs with the first UE 802. In one example, the PRS request message 812 may include one or more parameters for at least one of the SL ranging protocol version 840 that is used or supported by the first UE 802, one or more supported PRS channels 842 for the first UE 802, one or more supported per-channel bandwidths 844 for the first UE 802, an assigned PRS Tx time 846 and/or a post PRS Tx time 848, etc. The one or more supported PRS channels 842 may indicate the channel(s) in which the first UE 802 may transmit and/or receive PRS with another UE. The one or more supported per-channel PRS bandwidths 844 may indicate a PRS bandwidth (e.g., a maximum bandwidth) in which the first UE 802 may support for a channel. The assigned PRS Tx time 846 may indicate a time in which one or more PRSs may be transmitted by the first UE 802. The post PRS Tx time 848 may indicate a time in which a post PRS message (e.g., the post PRS message 632) may be transmitted by the first UE 802.

In other words, the first UE 802 may indicate a list of criteria related to SL-based ranging and positioning in the PRS request message 812, such that a target UE (e.g., the second UE 804) that receives the PRS request message 812 may determine whether its configuration and/or capability is compatible with the first UE 802. In one example, the first UE 802 may include the SL ranging protocol version 840, the one or more supported PRS channels 842, and/or the one or more supported per-channel bandwidths 844 in the PRS request message 810 if the first UE 802 has not transmitted/ exchanged the capability message 808 with the second UE 804. If the first UE 802 has transmitted/exchanged the capability message 808 with the second UE 804 prior to transmitting the PRS request message 812, and the capability message has included the SL ranging protocol version 840, the one or more supported PRS channels 842, and/or the one or more supported per-channel bandwidths 844, the first UE 802 may be configured to not include information that has already been conveyed in the capability message 808 in the PRS request message 812 (e.g., to reduce signaling overhead). In other words, the first UE 802 may skip including (e.g., may exclude) the SL ranging protocol version 840, the one or more supported PRS channels 842, and/or the one or more supported per-channel bandwidths 844 in the PRS request message 812 if the first UE 802 has indicated them to the second UE 804 via the capability message 808.

At 814, in response to the PRS request message 812, the second UE 804 may transmit a PRS response message 816 to the first UE 802. For example, the PRS response message 816 may indicate whether the second UE 804 is able to grant the first UE 802's PRS request, whether the second UE 804 meets or is compatible with the criteria indicated by the first UE 802 in the PRS request message 812 (e.g., the SL ranging protocol version 840, the one or more supported PRS channels 842, and/or the one or more supported per-channel bandwidths 844, etc.), and/or whether the second UE 804 has any request(s), selection(s), and/or condition(s)

for accepting the PRS request, etc. In one example, when the second UE 804 determines that it is able to grant the first UE 802's PRS request, the PRS response message 816 may indicate an acknowledgement (ACK). If the second UE 804 determines that it is unable to grant the first UE 802's PRS request, the PRS response message 816 may indicate a negative ACK (NACK), or the second UE 804 may not respond to the first UE 802 with the PRS response message 816. In another example, the PRS response message 816 may include one or more request(s), selection(s), and/or condition(s) for the second UE 804 to accept the PRS request. For example, the first UE 802 may indicate multiple PRS channels and/or PRS bandwidths supported by the first UE 802 in the PRS request message 812, and the second UE 804 may respond to the first UE 802 with one or more PRS channels and/or one or more PRS bandwidths supported by the second UE 804 in the PRS response message 816.

At 818, in response to the PRS response message 816, the first UE 802 may transmit a PRS confirmation message 820 to the second UE 804. For example, the PRS confirmation message 820 may confirm the PRS transmissions between the first UE 802 and the second UE 804, and/or the PRS confirmation message 820 may indicate the configuration in which the first UE 802 is going to apply to the PRS transmission/reception, such as the PRS transmission time, the PRS channel(s), and/or the PRS bandwidth(s), etc. Thus, the second UE 804 may apply a corresponding configuration for its PRS transmission/reception after receiving the PRS confirmation message 820. As such, the PRS confirmation message 820 may also include one or more parameters for at least one of the SL ranging protocol version 840, the one or more supported PRS channels 842, the one or more supported per-channel PRS bandwidths 844, the assigned PRS Tx time 846 and/or the post PRS Tx time 848 of the first UE 802. The first UE 802 may complete the three-way handshake after transmitting the PRS confirmation message 820 to the second UE 804.

By including the one or more supported PRS channels 842 and/or the one or more supported per-channel PRS bandwidths 844 in the PRS request message 812 and/or the PRS confirmation message 820, an initiator UE (e.g., the first UE 802) and/or a target UE (e.g., the second UE 804) may determine the ranging/positioning compatibility for one or more SL-based ranging and positioning sessions without a capability message exchange (e.g., as shown at 806). Also, by indicating the PRS Tx time 846 and/or the post PRS Tx time in the PRS request message 812 and/or the PRS confirmation message, an initiator UE (e.g., the first UE 802) may be able to determine and/or assign these Tx times, rather than have the target UE(s) (e.g., the second UE 804) derive them.

At 822, after the three-way handshake is established and completed, as described in connection with 622 and 626 of FIG. 6, the first UE 802 may transmit one or more PRSs 824 to the second UE 804. At 826, in response to the one or more PRSs 824 received, the second UE 804 may transmit one or more PRSs 828 to the first UE 802.

At 830, after receiving the one or more PRSs 826 from the second UE 804, the first UE 802 may measure the received one or more PRSs 826, such as the time and/or the angle in which the one or more PRSs 826 are received, and the first UE 802 may transmit information related to at least the measurement to the second UE 804 via a post PRS message 832. Similarly, at 834, the second UE 804 may measure the one or more PRSs 828 received from the first UE 802, and the second UE 804 may transmit information related to at least the measurement to the first UE 804 via a post PRS message 836.

In one aspect of the present disclosure, to enhance the performance and efficiency of the SL-based ranging and positioning, the post PRS message 832 transmitted from the first UE 802 and/or the post PRS message 836 transmitted from the second UE 804 may include one or more parameters for at least one of: a PRS transmission-reception (Tx-Rx) time difference 850/851, a UE velocity 852, an accuracy/confidence metric associated with the UE velocity, a UE acceleration 854, an accuracy/confidence metric associated with the UE acceleration, a PRS AoA 856 and its associated accuracy metric (e.g., an AoA accuracy), a PRS AoD 858 and its associated accuracy metric (e.g., an AoD accuracy), a UE antenna identifier (ID) 860, and/or a UE antenna location 862.

In one aspect, to reduce signaling overhead (e.g., for the post PRS messages 832, 836), the first UE 802 and the second UE 804 may measure/determine a PRS Tx-Rx time difference 850/851 for the one or more PRSs transmitted and the one or more PRSs received (e.g., the PRS 824 and the PRS 828), and the first UE 802 and the second UE 804 may transmit the measured/determined PRS Tx-Rx time difference 850/851 to each other. Then, the first UE 802 and/or the second UE 804 may be able to determine an RTT for the one or more PRSs transmitted and the one or more PRSs received.

Figure 9:
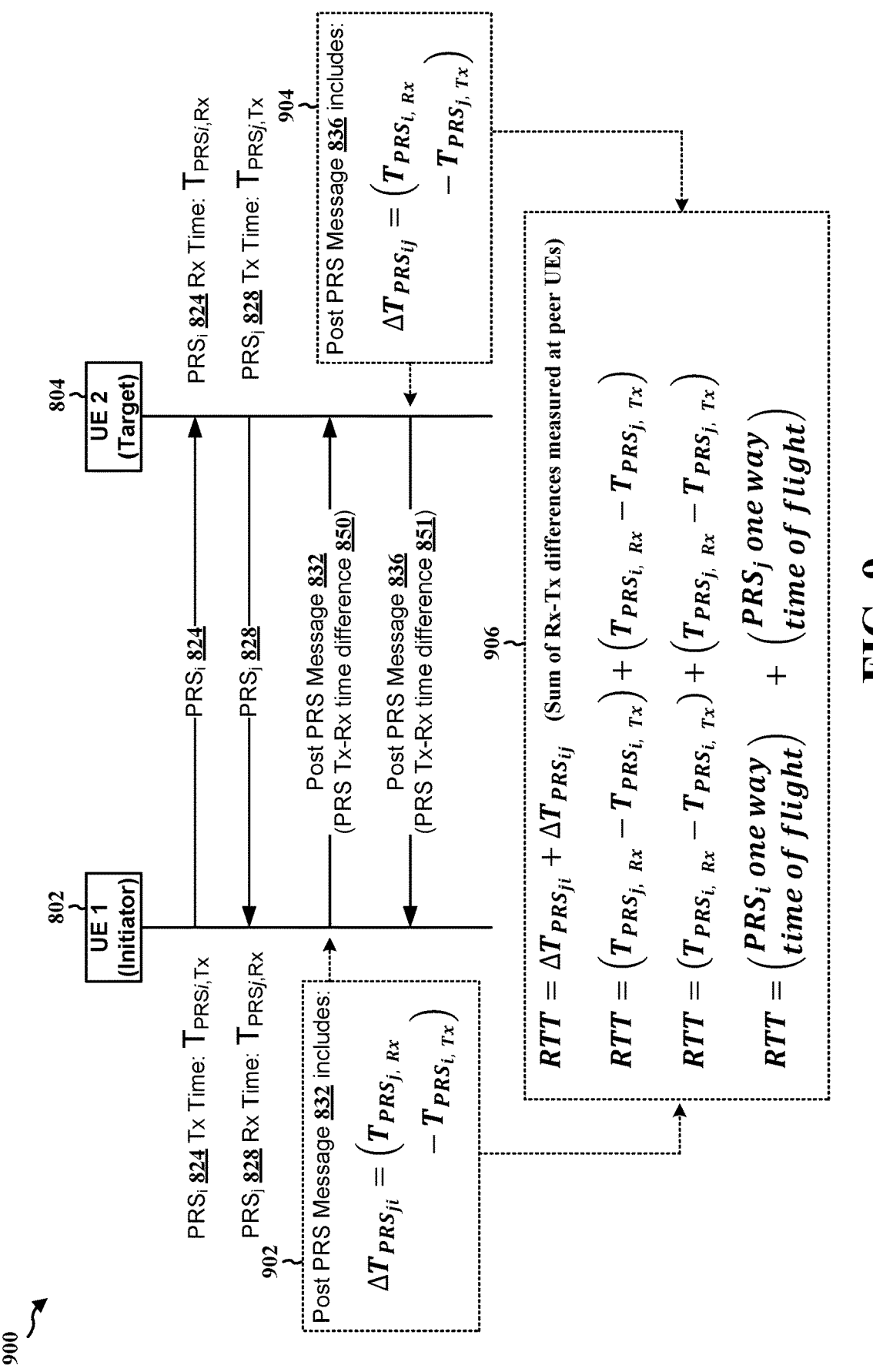
FIG. 9 is a diagram illustrating an example of determining a round trip time (RTT) for PRSs received and transmitted based on PRS Tx-Rx time differences according to aspects of the present disclosure.

FIG. 9 is a diagram 900 illustrating an example of determining an RTT for PRSs received and transmitted based on PRS Tx-Rx time differences according to aspects of the present disclosure. As shown at 902, after the first UE 802 transmitted the one or more PRSs 824 (e.g., $T_{PRS_j}$) to the second UE 804 and received the one or more PRS 828 (e.g., $T_{PRS_j}$) from the second UE 804, the first UE 802 may calculate a PRS Tx-Rx time difference 850 (e.g., $\Delta T_{PRS_{ji}}$) between the transmitted PRSs 824 and the received PRSs 828 by subtracting the time in which the PRSs 828 are received (e.g., $T_{PRS_{j, Rx}}$) with the time in which the PRSs 824 are transmitted (e.g., $T_{PRS_{i, Tx}}$), e.g., $\Delta T_{PRS_{ji}} = (T_{PRS_{j, Rx}} - T_{PRS_{i, Tx}})$. Then, the first UE 802 may include the calculated PRS Tx-Rx time difference 850 in the post PRS message 832, and transmit the post PRS message 832 to the second UE 804.

Similarly, as shown at 904, after the second UE 804 received the one or more PRSs 824 (e.g., $T_{PRS_i}$) from the first UE 802 and transmitted the one or more PRS 828 (e.g., $T_{PRS_j}$) to the first UE 802, the second UE 804 may calculate a PRS Tx-Rx time difference 851 (e.g., $\Delta T_{PRS_{ij}}$) between the received PRSs 824 and the transmitted PRSs 828 by subtracting the time in which the PRSs 824 are received (e.g., $T_{PRS_{i, Rx}}$) with the time in which the PRSs 828 are transmitted (e.g., $T_{PRS_{j, Tx}}$), e.g., $\Delta T_{PRS_{ij}} = (T_{PRS_{i, Rx}} - T_{PRS_{j, Tx}})$. Then, the first UE 802 may include the calculated PRS Tx-Rx time difference 851 in the post PRS message 836, and transmit the post PRS message 836 to the first UE 802.

As shown at 906, based on the PRS Tx-Rx time difference 850 calculated/measured by the first UE 802 and the PRS Tx-Rx time difference 851 calculated/measured by the second UE 804, the RTT from the first UE 802 to the second UE 804 may be calculated by adding the respective Rx-Tx time differences:

$$RTT = \Delta T_{PRS_{ji}} + \Delta T_{PRS_{ij}} \ (\text{sum of } Rx\text{–}Tx \text{ differences measured at } UEs),$$
$$RTT = (T_{PRS_{j,Rx}} - T_{PRS_{i,Tx}}) + (T_{PRS_{i,Rx}} - T_{PRS_{j,Tx}}),$$
$$RTT = (T_{PRS_{i,Rx}} - T_{PRS_{i,Tx}}) + (T_{PRS_{j,Rx}} - T_{PRS_{j,Tx}}),$$
$$RTT = \left(\begin{array}{c} PRS_i \ \text{one way} \\ \text{time of flight} \end{array}\right) + \left(\begin{array}{c} PRS_j \ \text{one way} \\ \text{time of flight} \end{array}\right).$$

For example, the first UE 802 may transmit the PRSs 824 at a time 00:01 and the second UE 804 may receive the PRSs 824 at a time 00:02. Then, the second UE 804 may transmit the PRSs 828 at a time 00:04 and the first UE 802 may receive the PRSs 828 at a time 00:06. Thus, the first UE 802 may determine the PRS Tx-Rx time difference 850 by subtracting the time in which the PRSs 828 are received with the time in which the PRSs 824 are transmitted, e.g., the PRS Tx-Rx time difference 850=00:06–00:01=5 (e.g., 5 seconds). Similarly, the second UE 804 may determine the PRS Tx-Rx time difference 851 by subtracting the time in which the PRSs 824 are received with the time in which the PRSs 828 are transmitted, e.g., the PRS Tx-Rx time difference 851=00:02–00:04=–2 (e.g., –2 seconds). As such, the RTT between the PRSs 824 and the PRSs 828 may be obtained by adding the PRS Tx-Rx time difference 850 and the PRS Tx-Rx time difference 851, e.g., RTT=5 seconds+–2 seconds=3 seconds. By indicating the PRS Tx-Rx time difference (e.g., 850/851) instead of the PRS transmission time and the PRS reception time (e.g., as illustrated in connection with 638 of FIG. 6), the first UE 802 and the second UE 804 may include one timestamp (e.g., the Tx-Rx time difference $\Delta T_{PRS_{ji}}$ or $\Delta T_{PRS_{ij}}$) in the post PRS message 632/636 instead of two timestamps (e.g., two individual Tx and Rx times: $T_{PRS_{i, Tx}}$, $T_{PRS_{i, Rx}}$ or $T_{PRS_{i, Rx}}$, $T_{PRS_{i, Tx}}$, etc.) for determining the RTT, which may reduce the signaling overhead for the post PRS message 632/636.

Referring back to FIG. 8, in another aspect of the present disclosure, the post PRS message 832 transmitted from the first UE 802 and/or the post PRS message 836 transmitted from the second UE 804 may include a UE velocity 852, an accuracy/confidence metric associated with the UE velocity, a UE acceleration 854, and/or an accuracy/confidence metric associated with the UE acceleration. Information related to the UE velocity 852 and/or the UE acceleration 854 and their respective accuracies may enable positioning of a moving UE to a fixed, reference UE. For example, successive, temporally-spaced sidelink ranging measurements between a moving UE and a fixed location UE (e.g., an RSU) may enable the moving UE by virtual triangulation, if the moving UE's displacement, d, between successive sidelink ranging measurements are known.

Figure 10:
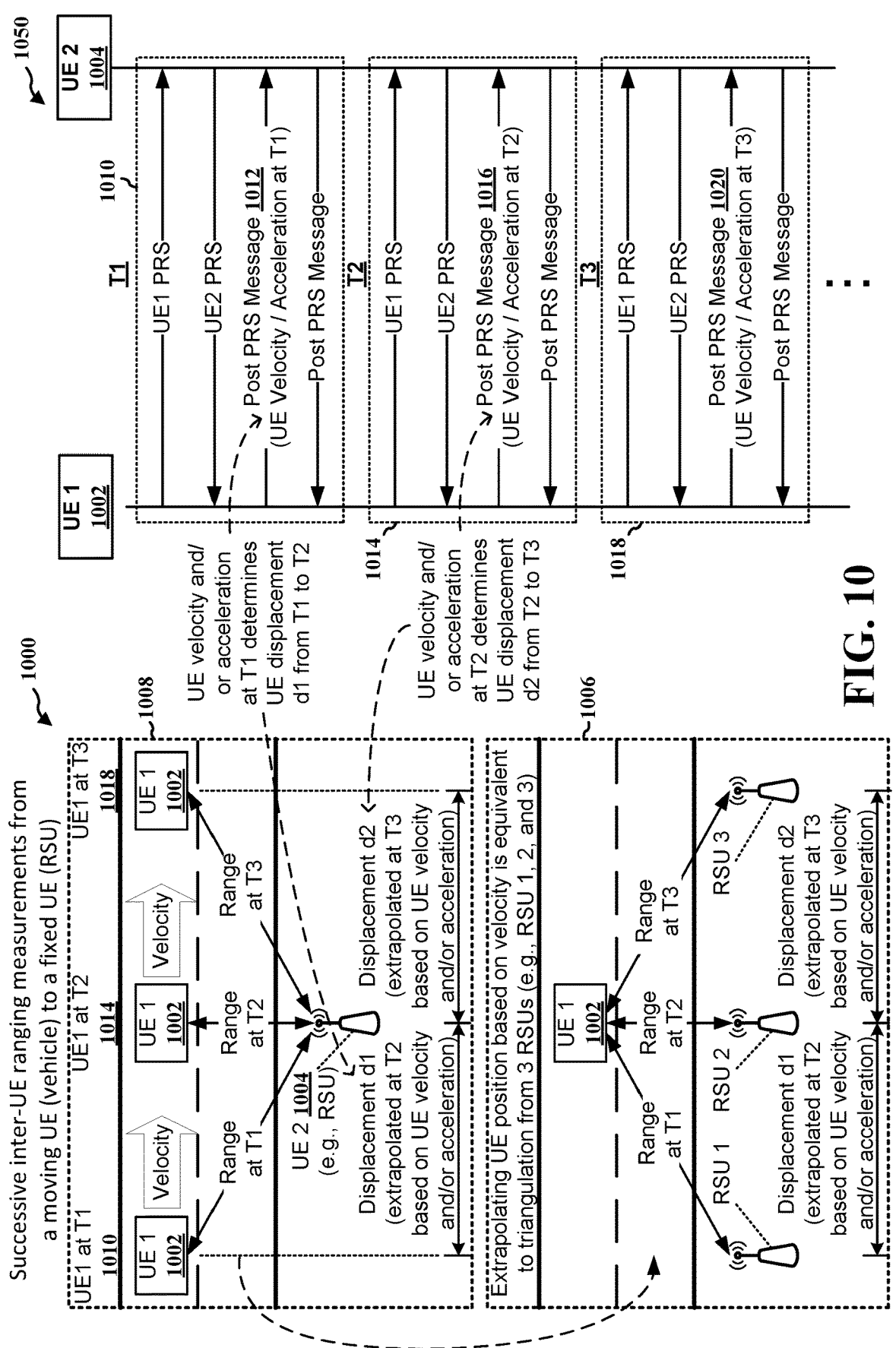
FIG. 10 is a diagram illustrating an example of an SL-based ranging and positioning based on UE velocity and/or UE acceleration according to aspects of the present disclosure.

FIG. 10 is a diagram 1000 illustrating an example of an SL-based ranging and positioning based on UE velocity and/or UE acceleration according to aspects of the present disclosure. Optional aspects may be illustrated in dashed lines. In one example, as shown at 1006, if a first UE 1002 is able to communicate with another three UEs that are stationary, such as three roadside units (RSUs), the UE 1002's position may be extrapolated based on triangulation positioning. For example, the first UE 1002 may exchange PRSs with a first RSU (e.g., RSU 1), a second RSU (e.g., RSU 2), and a third RSU (e.g., RSU 3), such as described in connection with FIGS. 6 and 7. Based on measuring the RTTs for the PRSs exchanged with each of the three RSUs, the distance between the first UE 1002 with respect to each RSU may be determined. For example, based on determining the RTT for PRSs transmitted to the first RSU and the corresponding PRSs received from the first RSU, the first UE 1002's range with respect to the first RSU may be determined. If the first UE 1002's distances with respect to each of the three RSUs are known, the first UE 1002's position with respect to the three RSUs or the first UE 1002's absolute position may be determined based on the triangulation positioning.

In some examples, if a UE is unable to communicate (e.g., exchange PRSs) with at least three stationary UEs (e.g., RSUs), the position of the UE with respect to a reference UE may still be determined based on a virtual triangulation positioning if the UE is moving at a known velocity and/or acceleration and the reference UE is stationary (e.g., an RSU at a fixed location). For example, as shown at 1008, if the first UE 1002 is moving at a known velocity (e.g., 60 miles per hour) and optionally with an acceleration (e.g., 3 m/s$^2$), and the first UE 1002 is able to communicate with a second UE 1004 that is stationary, the first UE 1002 may exchange PRSs and post PRS messages with the second UE 1004 in at least one of three points in time, such as at times T1, T2, and T3. Then, in at least one of the three points in time, the first UE 1002 may indicate its velocity and optionally its acceleration (e.g., if the first UE 1002 accelerating) to the second UE 1004.

Based on the exchanged PRSs, as described in connection with FIGS. 4 and 6, the first UE 1002 may be able to determine its range with respect to the second UE 1004 at the times T1, T2, and T3.

For example, as illustrated by the communication flow 1050 at 1010, at the time T1, the first UE 1002 may transmit one or more PRSs to the second UE 1004 and receive one or more PRSs from the second UE 1004. Then, the first UE 1002 may transmit a post PRS message 1012 to the second UE 1004, which may include measurement related to the exchanged PRSs (e.g., the PRS Tx and Rx times, the Tx-Rx time difference, etc.), such that the RTT between the first UE 1002 and the second UE 1004 at the time T1 may be determined, and the first UE 1002's range with respect to the second UE 1004 at the time T1 may also be determined based on the RTT, such as described in connection with FIGS. 4 and 6. In addition, the first UE 1002 may also include its velocity (e.g., the UE velocity 852) and optionally its acceleration (e.g., the UE acceleration 854) at the time T1 in the post PRS message 1012. In some examples, the first UE 1002 may further include respective accuracies (e.g., accuracy/confidence metrics) that are associated with its velocity and/or acceleration in the post PRS message 1012 to enhance the accuracy of the positioning. For example, the accuracy may be an enumerated value which indicates the accuracy is accurate to certain degrees.

Similarly, as illustrated by the communication flow 1050 at 1014, at the time T2, the first UE 1002 may transmit one or more PRSs to the second UE 1004 and receive one or more PRSs from the second UE 1004. Then, the first UE 1002 may transmit a post PRS message 1016 to the second UE 1004, which may include measurement related to the exchanged PRSs (e.g., the PRS Tx and Rx times, the Tx-Rx time difference, etc.), such that the RTT between the first UE 1002 and the second UE 1004 at the time T2 may be determined, and the first UE 1002's range with respect to the second UE 1004 at the time T2 may also be determined based on the RTT. In some examples, the first UE 1002 may include its velocity, acceleration (if available), and/or their associated accuracies at the time T2 in the post PRS message 1016. In other examples, the first UE 1002 may be configured to not include its velocity, acceleration, and their associated accuracies at the time T2 if the first UE 1002's velocity and/or acceleration have not changed or have not changed by a threshold. As such, the velocity, acceleration, and/or their respective accuracy of the first UE 1002 at the times T1 and T2 may be assumed (e.g., by the second UE 1004) to be the same. This may reduce signaling overhead for the UE velocity and/or acceleration reporting in the post PRS message. Based on the first UE 1002's velocity and/or acceleration indicated at the time T1 (e.g., in the post PRS message 1012), the first UE 1002's displacement (e.g., a first displacement—d1) between the time T1 and the time T2 may be extrapolated at the time T2. For example, if the first UE 1002 is moving at a constant velocity of sixty (60) miles per hour and the time T1 and the time T2 is one minute apart, then the displacement (e.g., d1) of the first UE 1002 between the time T1 and the time T2 may be one (1) mile.

As illustrated at 1018, at the time T3, the first UE 1002 may exchange one or more PRSs with the second UE 1004. Then, the first UE 1002 may transmit a post PRS message 1020 to the second UE 1004, which may include measurement related to the exchanged PRSs, such that the RTT and/or the range between the first UE 1002 and the second UE 1004 at the time T3 may be determined. Similarly, the first UE 1002 may include its velocity, acceleration (if available), and/or their associated accuracies at the time T3 in the post PRS message 1020, and may not include them if the first UE 1002's velocity and/or acceleration have not changed. Based on the first UE 1002's velocity and/or acceleration at the time T2, the first UE 1002's displacement (e.g., a second displacement—d2) between the time T2 and the time T3 may be extrapolated at the time T3.

As shown at 1008, when the first UE 1002's range with respect to the second UE 1004 is known at three different points in time, and the displacement (e.g., d1, d2) between each two consecutive points in time is also known, then the first UE 1002's position at three points in time with respect to the second UE 1004 may be similar to the first UE 1002's position with respect to the three RSUs described at 1006. As such, the first UE 1002's position with respect to the second UE 1004 may be determined based on a virtual triangulation positioning.

Referring back to FIG. 8, by including the UE velocity 852, the accuracy/confidence metric associated with the UE velocity, the UE acceleration 854, and/or the accuracy/confidence metric associated with the UE acceleration in the post PRS message, the first UE 802's position with respect to the second UE 804 may be determined if the second UE 804 is stationary (e.g., an RSU at a fixed location). This may enable or improve the positioning of the first UE 802 when the GNSS and/or multiple RSUs are not available for triangulation.

In another aspect of the present disclosure, the post PRS message 832 transmitted from the first UE 802 and/or the post PRS message 836 transmitted from the second UE 804 may include at least one of a PRS AoA 856 and optionally its associated accuracy metric (e.g., an AoA accuracy), and/or a PRS AoD 858 and optionally its associated accuracy metric (e.g., an AoD accuracy). For example, the accuracy metric may be an enumerated value that indicates the accuracy to is accurate to tenth degree, to one degree, etc. The PRS AoA 856 and/or the PRS AoD 858 and their respective accuracy may enable positioning of the first UE 802 with respect to a fixed, reference UE, such as the second UE 804 if the second UE 804 is stationary (e.g., a fixed location RSU). In other words, by including the AoA associated with a received PRS or the AoD associated with a transmitted PRS, a UE's location may be determined, such as described in connection with FIG. 4.

Figure 11A:
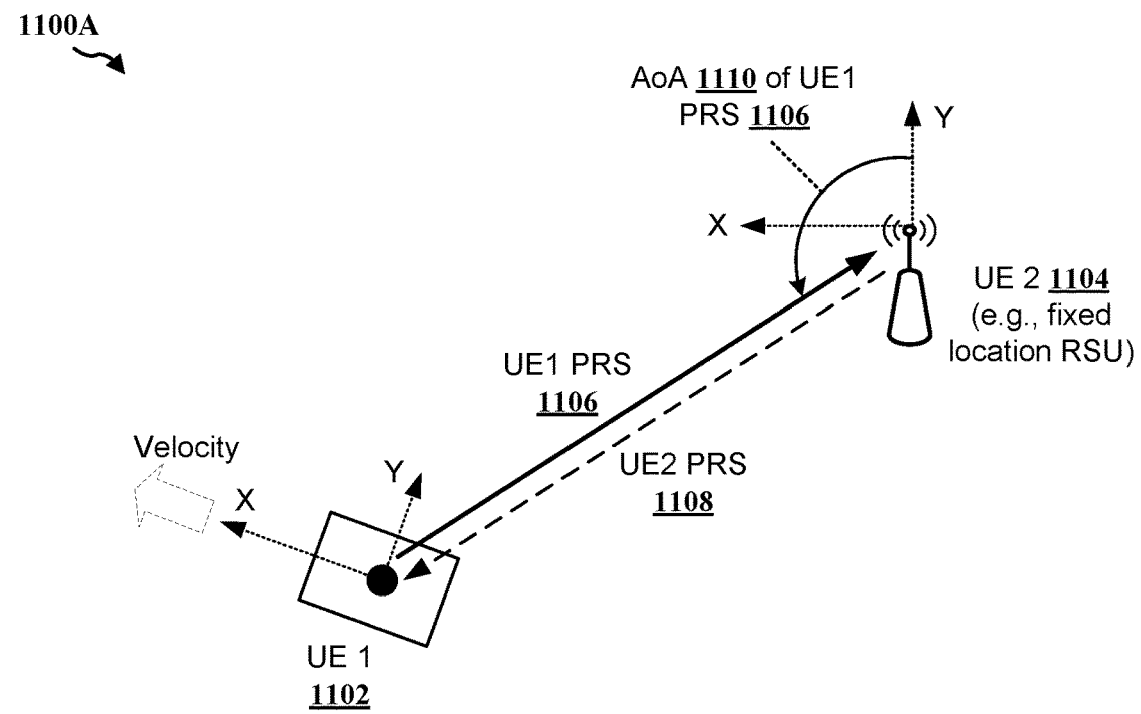
FIG. 11A is a diagram illustrating an example of a UE SL positioning based on PRS angle-of-arrival (AOA) and range according to aspects of the present disclosure.

FIG. 11A is a diagram 1100A illustrating an example of a UE SL positioning based on PRS AoA and range according to aspects of the present disclosure. A first UE 1102 may initiate an SL-based ranging and positioning session with a second UE 1104, such as described in connection with FIGS. 6 and 8. The second UE 1104 may be a fixed UE with a known location (e.g., an RSU). In one example, the first UE 1102 may transmit one or more PRSs 1106 to the second UE 1102, and may receive one or more PRSs 1108 from the second UE 1104. After the second UE 1104 receives the one or more PRSs 1106 from the first UE 1102, the second UE 1104 may determine an AoA 1110 of the one or more PRSs 1106 received from the first UE 1102 as the second UE 1104 and/or the first UE 1102 may be communicating with each other using directional antenna(s). Then, the second UE 1104 may indicate the determined AoA 1110 and optionally an accuracy/confidence metric associated with the AoA 1110 to the first UE 1102 in a post PRS message (e.g., the post PRS message 834). Based at least in part on the AoA 1110, the range between the first UE 1102, the second UE 1104 (e.g., derived from the RTTs of the PRSs 1106 and 1108), and/or optionally the second UE 1104's location (if known by the first UE 1102), the first UE 1102's may determine its position with respect to the second UE 1104 and/or its absolute position.

Figure 11B:
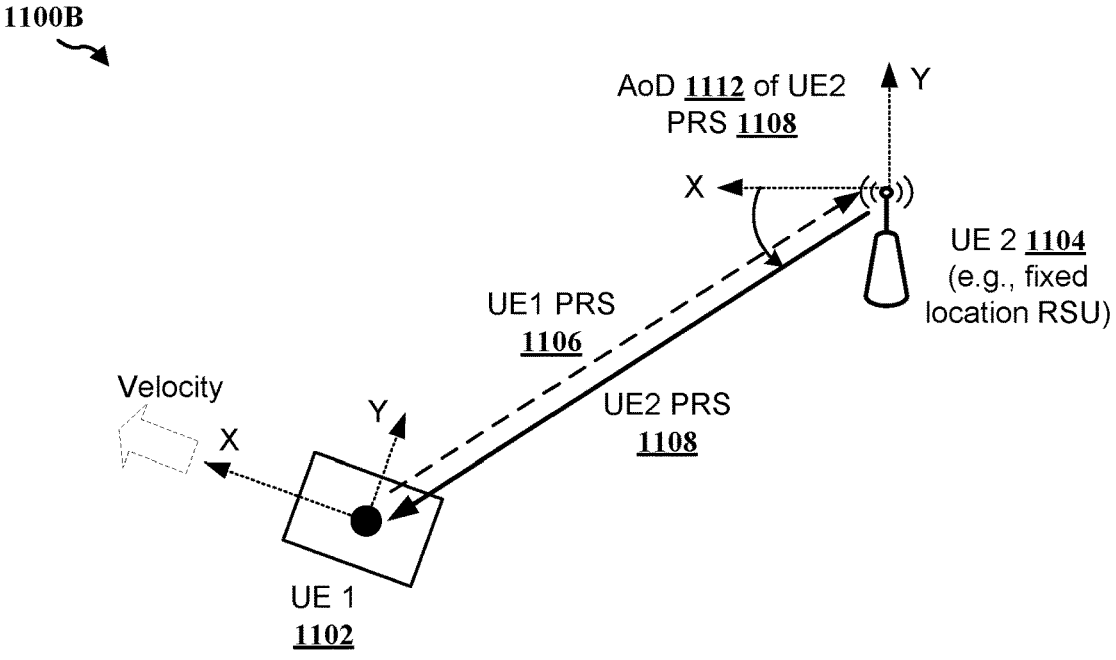
FIG. 11B is a diagram illustrating an example of a UE SL positioning based on PRS angle-of-departure (AOD) and range according to aspects of the present disclosure.

FIG. 11B is a diagram 1100B illustrating an example of a UE SL positioning based on PRS AoD and range according to aspects of the present disclosure. In one example, after the second UE 1104 transmits the one or more PRSs 1108 to the second UE 1102, the second UE 1104 may determine an AoD 1112 of the one or more PRSs 1108 transmitted the first UE 1102 as the second UE 1104 and/or the first UE 1102 may be communicating with each other using directional antenna(s). Then, the second UE 1104 may indicate the determined AoD 1112 and optionally an accuracy/confidence metric associated with the AoD 1112 to the first UE 1102 in a post PRS message (e.g., the post PRS message 834). Based at least in part on the AoD 1112, the range between the first UE 1102 and the second UE 1104 (e.g., derived from the RTTs of the PRSs 1106 and 1108), and/or optionally the second UE 1104's location (if known by the first UE 1102), the first UE 1102 may determine its position with respect to the second UE 1104 and/or its absolute position.

Referring back to FIG. 8, in another aspect of the present disclosure, to enable more accurate positioning for multi-antenna UEs, the post PRS message 832 transmitted from the first UE 802 and/or the post PRS message 836 transmitted from the second UE 804 may include a UE antenna ID 860 and/or a UE antenna location 862 for one or more antennas of the first UE 802 and/or the second UE 804. In one example, a UE having more than one antenna may transmit separate PRSs from multiple antennas and receive PRSs at the multiple antennas to conduct ranging measurements at each antenna location. Distinguishing each antenna with a UE-specific ID and including the antenna location associated with a transmitted PRS in the post PRS message may enable determining a range and/or a UE location more accurately.

Figure 12:
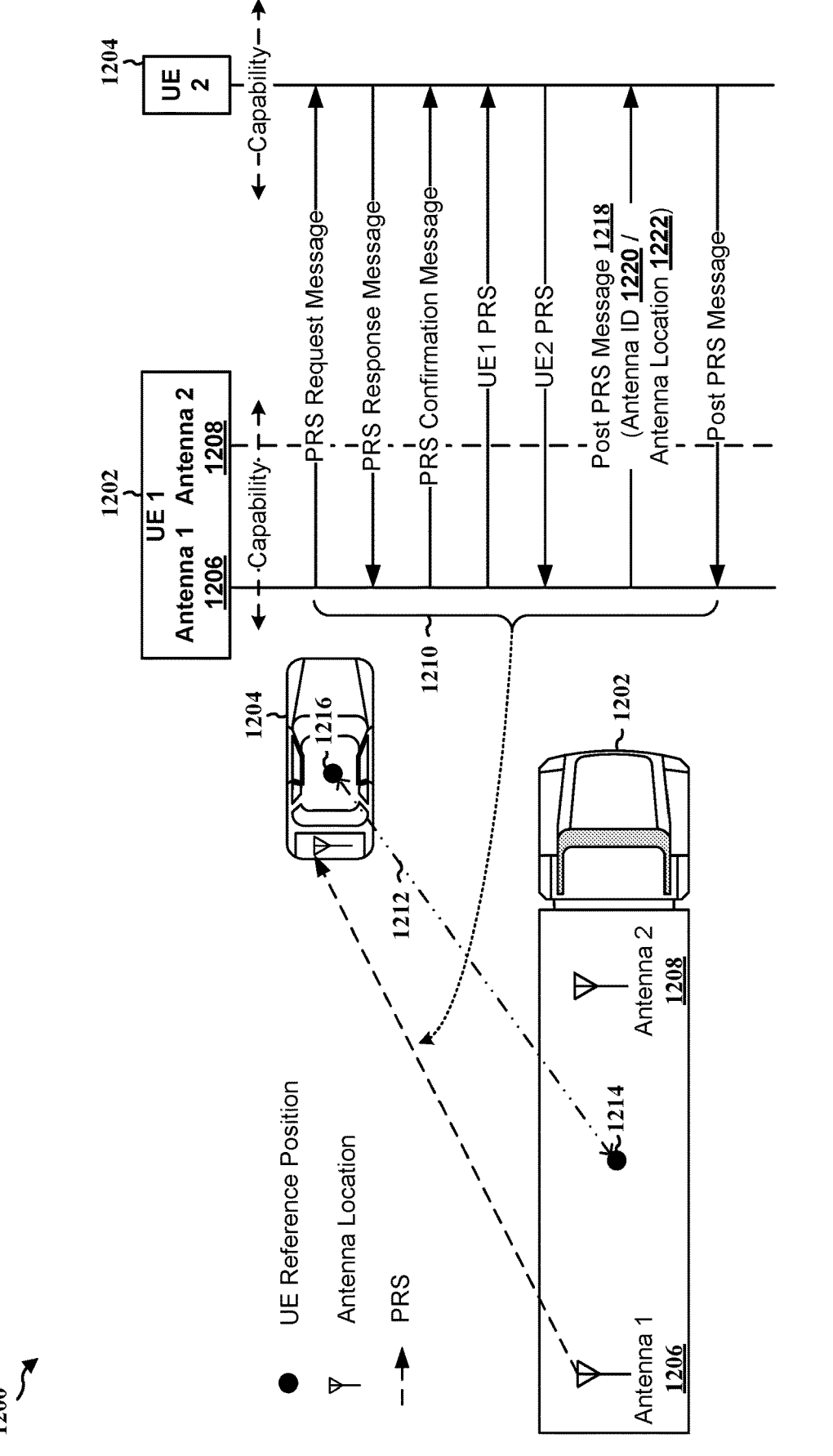
FIG. 12 is a diagram illustrating an example of a UE with multiple antennas establishing an SL-based ranging and positioning session with another UE via one of the multiple antennas according to aspects of the present disclosure.

FIG. 12 is a diagram 1200 illustrating an example of a UE with multiple antennas establishing an SL-based ranging and positioning session with another UE via one of the multiple antennas according to aspects of the present disclosure. Optional aspects may be illustrated in dashed lines. A first UE 1202 may include a first antenna 1206 at one location (e.g., at the rear of a vehicle) and a second antenna 1208 at another location (e.g., at the center or the front of the vehicle). In one example, the first UE 1202 may initiate an SL-based ranging and positioning session 1210 with a second UE 1204 using the first antenna 1206, where the second UE 1204 may have one antenna. The first UE 1202 may transmit a PRS request message to the second UE 1204 from the first antenna 1206, receive a PRS response message from the second UE 1204 at the first antenna 1206, transmit a PRS confirmation message to the second UE 1204 from the first antenna 1206, transmit one or more PRSs to the second UE 1204 from the first antenna 1206, receive one or more PRSs from the second UE 1204 at the first antenna 1206, transmit a post PRS message 1218 to the second UE 1204 from the first antenna 1206, and receive a post PRS message from the second UE 1204 at the first antenna 1206, etc., such as described in connection with FIGS. 6 and 8. Then, the first UE 1202 and/or the second UE 1204 may determine a range between the first antenna 1206 of the first UE 1202 and the antenna of the second UE 1202 (e.g., derived from the RTT of the PRSs). In some examples, the range between an antenna of a UE and an antenna of another UE may not accurately reflect the range between two UEs, or between the reference positions of the two UEs. For example, the first UE 1202 may have a reference position point (e.g., a center point) at 1214, where the first UE 1202 may use the reference position point at 1214 to determine its position with respect to other UE(s). Similarly, the second UE 1204 may have a reference position point (e.g., a center point) at 1216, where the second UE 1204 may use the reference position point at 1216 to determine its position with respect to other UE(s). As the first antenna 1206 may not locate in proximity to the reference position point at 1214 of the first UE 1202, as shown at 1212, the determined range between the first antenna 1206 of the first UE 1202 and the antenna of the second UE 1202 may not be close to (or may be different from) the range between the reference position point of the first UE 1202 and the reference position point of the second UE 1204.

In one aspect of the present disclosure, as described in connection with 860 and 862 of FIG. 8, the first UE 1202 may include an antenna ID 1220 (e.g., a UE-specific ID) and/or the antenna location 1222 that is associated with the first antenna 1206 (e.g., associated with the PRSs transmitted from the first antenna 1206) in the post PRS message 1218 transmitted to the second UE 1204. Based on the received antenna ID 1220 and/or the antenna location 1222, the second UE 1204 may make a more accurate determination of the first UE 1202's position. For example, the antenna location 1222 may indicate that the first antenna 1206 is located at the rear (or a specified part) of the first UE 1202. Thus, the second UE 1202 may be made aware that the distance between the first antenna 1206 and its antenna may not reflect the range between reference positions of the two UEs. In another example, the received antenna ID 1220 may infer that the first UE 1202 has multiple antennas, and the second UE 1204 may determine to establish additional ranging and positioning session(s) with other antennas of the first UE 1202, such as with the second antenna 1208.

Figure 13:
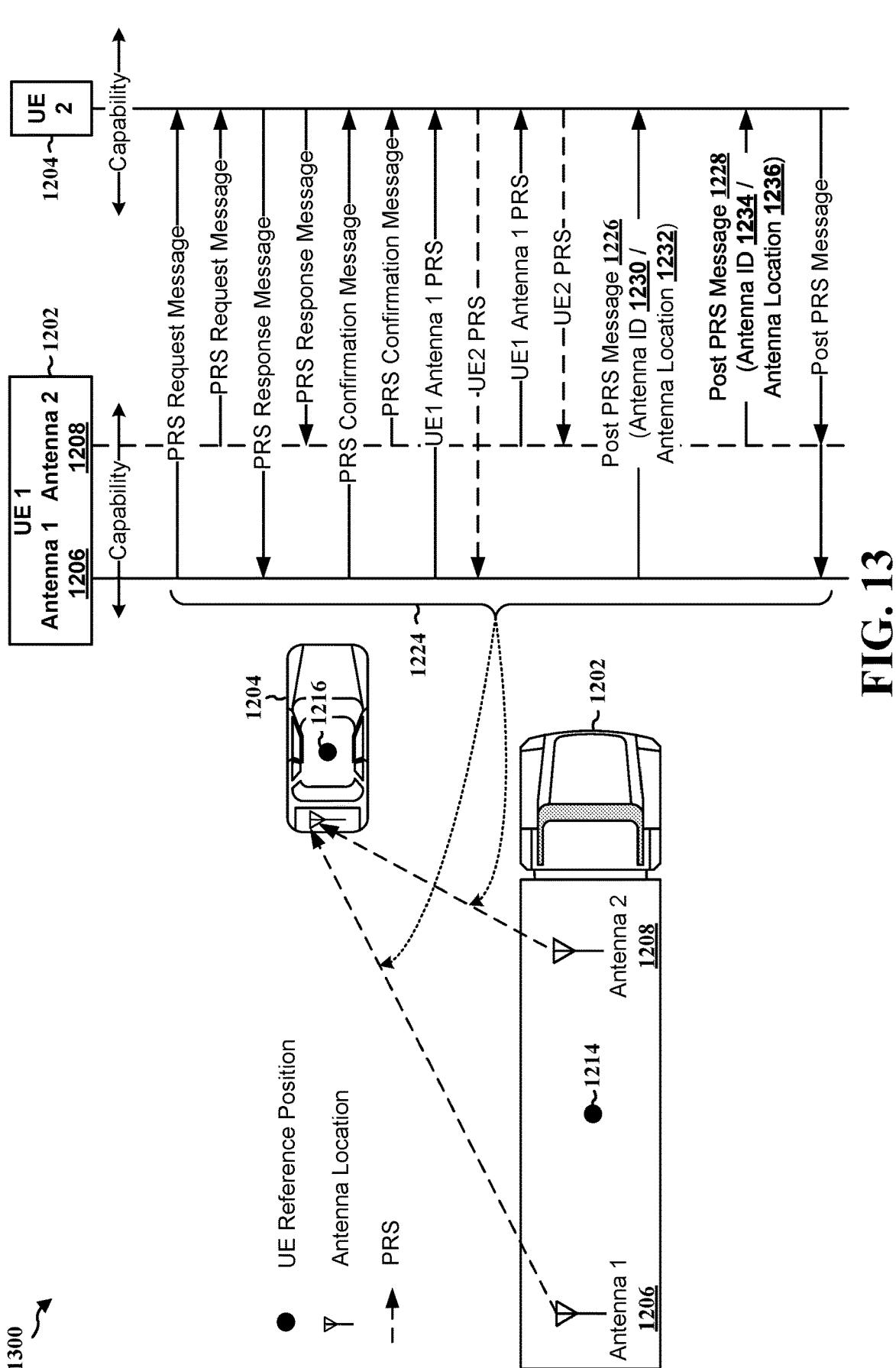
FIG. 13 is a diagram illustrating an example of a UE with multiple antennas establishing an SL-based ranging and positioning session with another UE via multiple antennas according to aspects of the present disclosure.

FIG. 13 is a diagram 1300 illustrating an example of a UE with multiple antennas establishing SL-based ranging and positioning sessions with another UE via multiple antennas according to aspects of the present disclosure. Optional aspects may be illustrated in dashed lines. In some examples, to enable a more accurate positioning of the first UE 1202 and/or the second UE 1204, the first UE 1202 may initiate one or more SL-based ranging and positioning sessions with a second UE 1204 using both the first antenna 1206 and the second antenna 1208. For example, the first UE 1202 may establish one SL-based ranging and positioning session with the second UE 1204 via the first antenna 1206, and the first UE 1202 may establish another SL-based ranging and positioning session with the second UE 1204 via the second antenna 1208. As such, as shown at 1224, the first UE 1202 may transmit a PRS request message from the first antenna 1206 and another PRS request message from the second antenna 1208 to the second UE 1204, then the first UE 1202 may receive a corresponding PRS response message from the second UE 1204 each of the first antenna 1206 and the second antenna 1208. In response, the first UE 1202 may transmit a PRS confirmation message from the first antenna 1206 and another PRS confirmation message from the second antenna 1208 to the second UE 1204 to complete the three-way handshake between each antenna of the first UE 1202 and the second UE 1204, such as described in connection with FIGS. 6 and 8. Then, the first UE 1204 may transmit one or more PRSs from the first antenna 1206 and one or more PRSs from the second antenna 1208 to the second UE, and may receive one or more PRSs at the first antenna 1206 and at the second antenna 1208 from the second UE respectively.

After transmitting the one or more PRSs from the first antenna 1206 and one or more PRSs from the second antenna 1208, and optionally after receiving the one or more PRSs from the second UE 1204, the first UE 1202 may transmit a post PRS message 1226 from the first antenna 1206 and/or a post PRS message 1228 from the second antenna 1208 to the second UE 1204, where the post message 1226 may include an antenna ID 1230 and/or an antenna location 1232 that is associated with the first antenna 1206 and/or the one or more PRSs transmitted from the first antenna 1206, and the post message 1228 may include an antenna ID 1234 and/or an antenna location 1236 that is associated with the second antenna 1208 and/or the one or more PRSs transmitted from the second antenna 1208. In some examples, antenna IDs and/or locations for different antennas may be transmitted in a same post PRS message. For examples, the first UE 1002 may transmit the antenna IDs and/or locations associated with the first antenna 1206 and the second antenna 1208 in the post PRS message 1226 but not in the post PRS message 1228.

Based on the received antenna IDs 1230 and 1234 and/or the antenna locations 1232 and 1236, the first UE 1202 and/or the second UE 1204 may make a more accurate determination of each other's position. For example, the antenna location 1232 may indicate that the first antenna 1206 is located at the rear of the first UE 1202 and the antenna location 1236 may indicate that the second antenna is located at the middle/front of the first UE 1202. Thus, after the first UE 1202 and/or the second UE 1204 determine the range between the first antenna 1206 and the antenna of the second UE 1204 and the range between the second antenna 1208 and the antenna of the second UE 1204, the first UE 1202 and/or the second UE 1204 may make a more accurate determination with regards to the distance between reference positions of the first UE 1202 and the second UE 1204 (e.g., at 1214 and 1216 respectively). For example, the reference position of the first UE 1202 may be estimated based on an average of the range between the first antenna 1206 and the antenna of the second UE 1204 and the range between the second antenna 1208 and the antenna of the second UE 1204, etc.

As such, a UE having multiple antennas may transmit separate PRSs from each of the multiple antennas to conduct ranging measurements to each antenna location. Then, the UE may distinguish each antenna with a UE-specific ID and including the antenna location associated with a transmitted PRS in the post PRS message. This may enable determining the range and/or the UE location more accurately.

In another aspect of the present disclosure, as described in connection with FIG. 7, aspects presented herein may extend to multiple UEs, such as up to N participating UEs. FIG. 14 is a diagram 1400 illustrating an example of an SL-based ranging and positioning between N participating UEs according to aspects of the present disclosure. Optional aspects may be illustrated in dashed lines. At 1406, a first UE 1402 (e.g., an initiator UE), a second UE 1404 (e.g., a target UE), and up to $N^{th}$ UE 1405 (e.g., a target UE) may exchange a capability message 1408 with each other, where the capability message 1408 may include at least information related to each UE's capability to perform an SL-based ranging and positioning. For example, the capability message 1408 may include at least one of an SL ranging protocol version 1440 used or supported by the transmitting UE, one or more supported PRS channels 1442 for the transmitting UE, and/or one or more supported per-channel PRS bandwidths 1444 for the transmitting UE, such as described in connection with FIG. 8. For example, the one or more supported PRS channels 1442 may indicate one or more channel(s) in which a UE may transmit and/or receive PRS with another UE. The one or more supported per-channel PRS bandwidths 1444 may indicate a PRS bandwidth (e.g., a maximum bandwidth) in which a UE may support for a channel. Based at least in part on the capability messages 1408, the participating UEs may determine whether they are candidates for performing the SL-based ranging and positioning and/or whether other UEs are candidates for performing the SL-based ranging and positioning. In some examples, the transmission/exchange of the capability message 1408 may be optional for the participating UEs.

At 1410, the first UE 1402 may transmit a PRS request message 1412 to multiple target UEs, which may include the second UE 1404 and up to the $N^{th}$ UE 1405. Then, at 1414, the first UE 1402 may receive a corresponding PRS response message 1416 from each of multiple target UEs. Based on the PRS response messages received, at 1418, the first UE 1402 may transmit a corresponding PRS confirmation message 1420 to each of multiple target UEs. As described in connection with FIG. 8, at least one of the PRS request message 1412 or the PRS confirmation message 1420 may include one or more parameters for at least one of: the SL ranging protocol version 1440 that is used or supported by the first UE 1402, one or more supported PRS channels 1442 for the first UE 1402, one or more supported per-channel PRS bandwidths 1444 for the first UE 1402, an assigned PRS Tx time 1446 and/or a post PRS Tx time 1448, etc. The one or more supported PRS channels 1442 may indicate the channel(s) in which the first UE 1402 may transmit and/or receive PRS with another UE. The one or more supported per-channel PRS bandwidths 1444 may indicate a PRS bandwidth (e.g., a maximum bandwidth) in which the first UE 1402 may support for a channel. The assigned PRS Tx time 1446 may indicate a time in which one or more PRSs may be transmitted by the first UE 1402. The post PRS Tx time 1448 may indicate a time in which a post PRS message may be transmitted by the first UE 1402.

At 1422, after the first UE 1402 establishes and completes the three-way handshake with each of the multiple target UEs, the participating UEs may exchange one or more PRSs 1424 with each other, such as described in connection with FIGS. 6 and 8.

At 1430, the participating UEs may exchange post PRS messages 1432 with each other, where the post PRS messages 1432 may include one or more parameters for at least one of: a PRS Tx-Rx time difference 1450, a UE velocity 1452, an accuracy/confidence metric associated with the UE velocity, a UE acceleration 1454, an accuracy/confidence metric associated with the UE acceleration, a PRS AoA 1456 and its associated accuracy metric (e.g., an AoA accuracy), a PRS AoD 1458 and its associated accuracy metric (e.g., an AoD accuracy), a UE antenna ID 1460, and/or a UE antenna location 1462, such as described in connection with FIGS. 8 to 13. The one or more parameters may improve the positioning for one or more UEs in the N participating UEs, and/or may improve the efficiency of the SL-based ranging and positioning sessions. For example, the PRS Tx-Rx time difference 1450 may reduce signaling overhead for calculating RTTs between UEs; the UE velocity 1452 and/or the UE acceleration 1454 and their respective accuracies may enable a moving UE to perform a virtual triangulation with respect to a stationary UE; the PRS AoA 1456 and/or the PRS AoD 1458 and their respective accuracies may enable a UE to determine its position or its position with respect to a stationary UE; and the UE antenna ID 1460 and/or the UE antenna location 1462 may enable more accurate positioning for multi-antenna UEs.

FIG. 15 is a flowchart 1500 of a method of wireless communication. The method may be performed by a UE or a component of a UE (e.g., the UE 104, 350, 602, 702, 704, 706, 708, 802, 1002, 1102, 1202, 1402; the apparatus 1602; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to establish one or more SL-based ranging and positioning sessions with one or more UEs.

At 1502, the UE may transmit, to the at least one UE, a capability message; and receive, from the at least one UE, a capability message, where each of the transmitted capability message and the received capability message may include one or more parameters including at least one of: the SL ranging protocol version, the one or more supported PRS channels, or the supported per-channel PRS bandwidth, such as described in connection with FIG. 8. For example, at 806, the first UE 802 may exchange a capability message 808 with the second UE 804, where the capability message 808 may include at least one of the SL ranging protocol version 840, the one or more supported PRS channels 842, and/or the supported per-channel PRS bandwidth 844. The transmission of the capability message and/or the reception of the capability message may be performed, e.g., by the capability message process component 1640, the reception component 1630, and/or the transmission component 1634 of the apparatus 1602 in FIG. 16.

At 1504, the UE may transmit, to at least one UE, a PRS request message, the transmitted PRS request message may include one or more parameters including at least one of: an SL ranging protocol version, one or more supported PRS channels, a supported per-channel PRS bandwidth, an initiator UE-assigned PRS Tx time, or a post-PRS Tx time, such as described in connection with FIG. 8. For example, at 810, the first UE 802 may transmit a PRS request message 812 to the second UE 804, where the PRS request message 812 may include at least one of: an SL ranging protocol version 840, one or more supported PRS channels 842, a supported per-channel PRS bandwidth 844, an initiator UE-assigned PRS Tx time 846, or a post-PRS Tx time 848.

Figure 16:
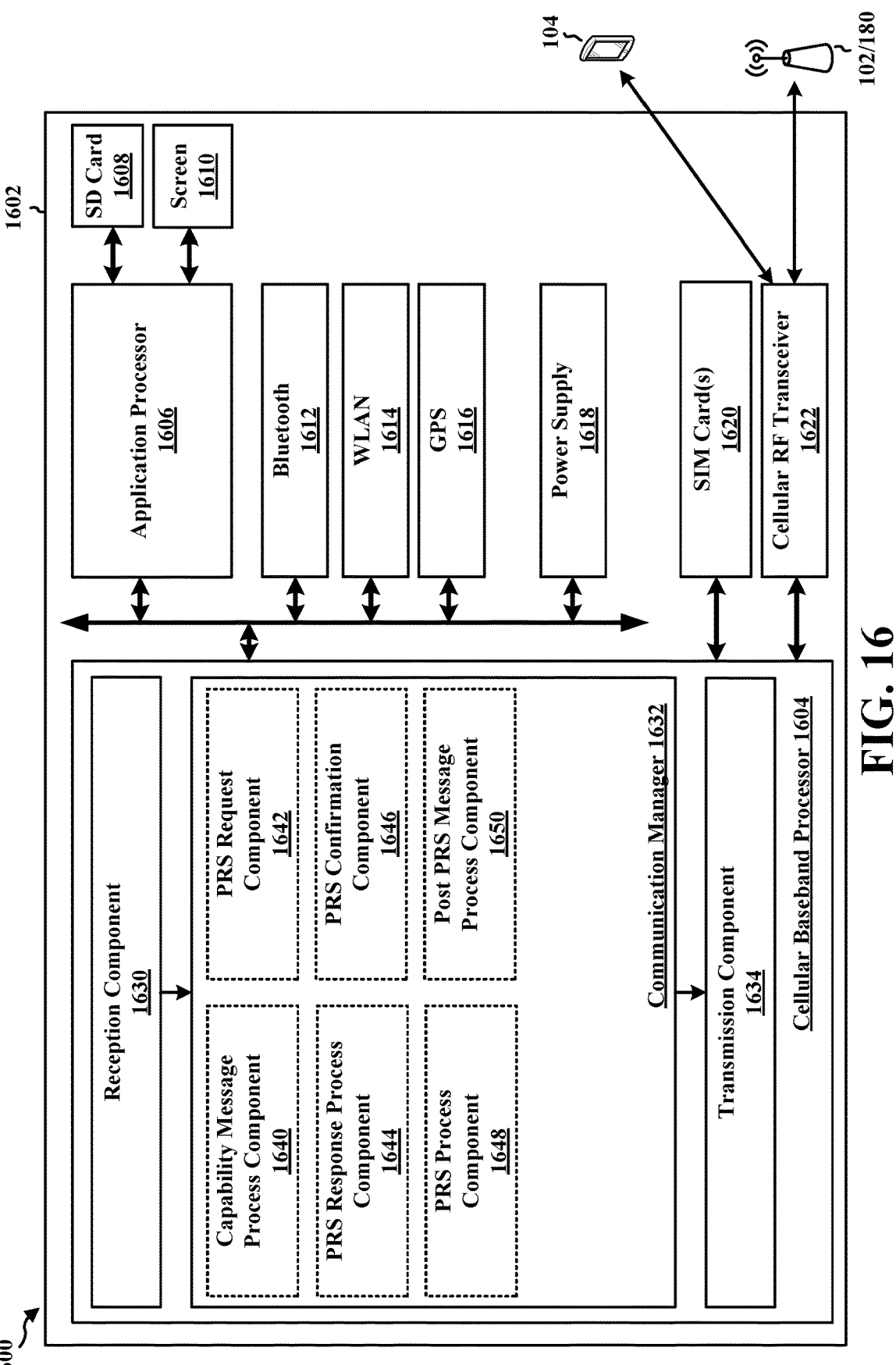
FIG. 16 is a diagram illustrating an example of a hardware implementation for an example apparatus in accordance with aspects presented herein.

The transmission of the PRS request message may be performed, e.g., by the PRS request component 1642 and/or the transmission component 1634 of the apparatus 1602 in FIG. 16.

At 1506, the UE may receive, from the at least one UE, a PRS response message based on the transmitted PRS request message, such as described in connection with FIG. 8. For example, at 814, the first UE 802 may receive a PRS response message 816 from the second UE 804 based on the transmitted PRS request message 812. The reception of the PRS response message may be performed, e.g., by the PRS response process component 1644 and/or the reception component 1630 of the apparatus 1602 in FIG. 16.

At 1508, the UE may transmit, to the at least one UE, a PRS confirmation message based on the received PRS response message, the transmitted PRS confirmation message may include one or more parameters including at least one of: the SL ranging protocol version, the one or more supported PRS channels, the supported per-channel PRS bandwidth, the initiator UE-assigned PRS Tx time, or the post-PRS Tx time, such as described in connection with FIG. 8. For example, at 818, the first UE 802 may transmit a PRS confirmation message 820 based on the received PRS response message 816, where the transmitted PRS confirmation message may include at least one of: the SL ranging protocol version 840, the one or more supported PRS channels 842, the supported per-channel PRS bandwidth 844, the initiator UE-assigned PRS Tx time 846, or the post-PRS Tx time 848. The transmission of the PRS confirmation message may be performed, e.g., by the PRS confirmation component 1646 and/or the transmission component 1634 of the apparatus 1602 in FIG. 16.

In one example, if the capability message includes at least one of the SL ranging protocol version, the one or more supported PRS channels, or the supported per-channel PRS bandwidth, then the PRS request message may include at least one of the initiator UE-assigned PRS Tx time or the post-PRS Tx time, and may exclude at least one of the SL ranging protocol version, the one or more supported PRS channels, or the supported per-channel PRS bandwidth.

At 1510, the UE may transmit, to the at least one UE, one or more PRSs and receive, from the at least one UE, one or more PRSs based at least in part on at least one of the transmitted PRS request message or the transmitted PRS confirmation message, such as described in connection with FIG. 8. For example, at 822 and 826, the first UE 802 may transmit, to the second UE 804, one or more PRSs 824 and receive, from the second UE 804, one or more PRSs 828 based at least in part on at least one of the transmitted PRS request message 812 or the transmitted PRS confirmation message 820. The transmission of the one or more PRSs and/or the reception of the one or more PRSs may be performed, e.g., by the PRS process component 1648, the reception component 1630, and/or the transmission component 1634 of the apparatus 1602 in FIG. 16.

At 1512, the UE may transmit, to the at least one UE, a post-PRS message and receive, from the at least one UE, a post-PRS message based on the transmitted one or more PRSs and the received one or more PRSs, where each of the transmitted post-PRS message and the received post-PRS message may include one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location, such as described in connection with FIG. 8. For example, at 830 and 834, the first UE 802 may transmit, to the second UE 804, a post-PRS message 832 and receive, from the second UE 804, a post-PRS message 836 based on the transmitted one or more PRSs 824 and the received one or more PRSs 828, where each of the transmitted post-PRS message 832 and the received post-PRS message 836 may include at least one of: a PRS Tx-Rx time difference 850, a UE velocity 852, an accuracy metric associated with the UE velocity, a UE acceleration 854, an accuracy metric associated with the UE acceleration, an AoA 856, an AoD 858, a UE antenna ID 860, or a UE antenna location 862. The transmission of the post-PRS message and/or the reception of the post-PRS message may be performed, e.g., by the post PRS message process component 1650, the reception component 1630, and/or the transmission component 1634 of the apparatus 1602 in FIG. 16.

In one example, as described in connection with FIG. 9, the UE may determine a PRS Tx-Rx time difference based on a difference between a Tx time of the transmitted one or more PRSs and a Rx time of the received one or more PRSs. In such an example, the transmitted post-PRS message may include the PRS Tx-Rx time difference and the received post-PRS message may include a PRS Tx-Rx time difference determined by the at least one UE. In such an example, the UE may determine an inter-UE RTT by adding the PRS Tx-Rx time difference in the transmitted post-PRS message and the PRS Tx-Rx time difference in the received post-PRS message, and the UE may estimate the UE's position or the UE's range with respect to the at least one UE based at least in part on the determined inter-UE RTT.

In one example, as described in connection with FIG. 10, at least one of the transmitted post-PRS message or the received post-PRS message may include at least one of the UE velocity or the accuracy metric associated with the UE velocity. In such an example, the UE may determine a first displacement of the UE between a first time and a second time based at least in part on the UE velocity at the first time, then the UE may determine a second displacement of the UE between the second time and a third time based at least in part on the UE velocity at the second time, and then the UE may estimate the UE's position with respect to the at least one UE based on the determined first displacement and the determined second displacement. In such an example, the at least one UE may be an RSU or may include an RSU.

In one example, as described in connection with FIG. 10, at least one of the transmitted post-PRS message or the received post-PRS message may include at least one of the UE velocity, the accuracy metric associated with the UE velocity, the UE acceleration, or the accuracy metric associated with the UE acceleration. In such an example, the UE may determine a first displacement of the UE between a first time and a second time based at least in part on the UE velocity and the UE acceleration at the first time, then the UE may determine a second displacement of the UE between the second time and a third time based at least in part on the UE velocity and the UE acceleration at the second time, and then the UE may estimate the UE's position with respect to the at least one UE based on the determined first displacement and the determined second displacement. In such an example, the at least one UE may be an RSU or may include an RSU.

In one example, as described in connection with FIG. 11A, the received post-PRS message may include an AoA of the transmitted one or more PRSs and the at least one UE may be at a fixed location. In such an example, the UE may determine the UE's range with respect to the at least one UE based on the transmitted one or more PRSs and the received one or more PRSs, and the UE may estimate the UE's position based on the UE's range with respect to the at least one UE, the AoA of the transmitted one or more PRSs, and the fixed location of the at least one UE. In such an example, the at least one UE may be aware of its location, and the UE may receive the location of the at least one UE from the at least one UE, such that the UE may determine the UE's location with respect to the at least one UE or the UE's location (e.g., the UE's absolute location, the UE's approximate geographical location, a known location, etc.) based at least in part on the location of the at least one UE.

In one example, as described in connection with FIG. 11B, the received post-PRS message may include an AoD of the received one or more PRSs and the at least one UE may be at a fixed location. In such an example, the UE may determine the UE's range with respect to the at least one UE based on the transmitted one or more PRSs and the received one or more PRSs, and the UE may estimate the UE's position based on the UE's range with respect to the at least one UE, the AoD of the received one or more PRSs, and the fixed location of the at least one UE. In such an example, the at least one UE may be aware of its location, and the UE may receive the location of the at least one UE from the at least one UE, such that the UE may determine the UE's location with respect to the at least one UE or the UE's location based at least in part on the location of the at least one UE.

In one example, as described in connection with FIGS. 12 and 13, the received post-PRS message may include a UE antenna ID and a UE antenna location for each of a plurality of antennas at the at least one UE. In such an example, the UE may transmit, to each of the plurality of antennas, one or more PRSs and receive, from each of the plurality of antennas, one or more PRSs based on the UE antenna ID associated with each of the plurality of antennas, the UE may calculate a range between the UE and each of the plurality of antennas based on the one or more PRSs transmitted to each of the plurality of antennas and the one or more PRSs received from each of the plurality of antennas, and then the UE may estimate the UE's position or the UE's range with respect to the at least one UE based on the calculated ranges between the UE and each of the plurality of antennas and based on the UE antenna location associated with each of the plurality of antennas.

In one example, as described in connection with FIGS. 12 and 13, the transmitted post-PRS message may include the UE antenna ID and the UE antenna location for each of a plurality of antennas at the UE. In such an example, the UE may transmit, to the at least one UE, one or more PRSs from each of the plurality of antennas and receive, from the at least one UE, one or more PRSs at each of the plurality of antennas, the UE may calculate a range between each of the plurality of antennas and the at least one UE based on the one or more PRSs transmitted from each of the plurality of antennas and the one or more PRSs received at each of the plurality of antennas, and then the UE may estimate the UE's position or the UE's range with respect to the at least one UE based on the calculated ranges between each of the plurality of antennas and the at least one UE.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the aforediscussed additional modules of the apparatus 1602.

The communication manager 1632 includes a capability message process component 1640 that is configured to transmit, to the at least one UE, a capability message; and receive, from the at least one UE, a capability message, where each of the transmitted capability message and the received capability message may include one or more parameters including at least one of: the SL ranging protocol version, the one or more supported PRS channels, or the supported per-channel PRS bandwidth, e.g., as described in connection with 1502 of FIG. 15. The communication manager 1632 further includes a PRS request component 1642 that is configured to transmit, to at least one UE, a PRS request message, the transmitted PRS request message may include one or more parameters including at least one of: an SL ranging protocol version, one or more supported PRS channels, a supported per-channel PRS bandwidth, an initiator UE-assigned PRS Tx time, or a post-PRS Tx time, e.g., as described in connection with 1504 of FIG. 15. The communication manager 1632 further includes a PRS response process component 1644 that is configured to receive, from the at least one UE, a PRS response message based on the transmitted PRS request message, e.g., as described in connection with 1506 of FIG. 15. The communication manager 1632 further includes a PRS confirmation component 1646 that is configured to transmit, to the at least one UE, a PRS confirmation message based on the received PRS response message, the transmitted PRS confirmation message may include one or more parameters including at least one of: the SL ranging protocol version, the one or more supported PRS channels, the supported per-channel PRS bandwidth, the initiator UE-assigned PRS Tx time, or the post-PRS Tx time, e.g., as described in connection with 1508 of FIG. 15. The communication manager 1632 further includes a PRS process component 1648 that is configured to transmit, to the at least one UE, one or more PRSs and receive, from the at least one UE, one or more PRSs based at least in part on at least one of the transmitted PRS request message or the transmitted PRS confirmation message, e.g., as described in connection with 1510 of FIG. 15. The communication manager 1632 further includes a post PRS message process component 1650 that is configured to transmit, to the at least one UE, a post-PRS message and receive, from the at least one UE, a post-PRS message based on the transmitted one or more PRSs and the received one or more PRSs, where each of the transmitted post-PRS message and the received post-PRS message may include one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location, e.g., as described in connection with 1512 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for transmitting, to the at least one UE, a capability message; and means for receiving, from the at least one UE, a capability message, where each of the transmitted capability message and the received capability message may include one or more parameters including at least one of: the SL ranging protocol version, the one or more supported PRS channels, or the supported per-channel PRS bandwidth (e.g., the capability message process component 1640, the reception component 1630, and/or the transmission component 1634). The apparatus 1602 includes means for transmitting, to at least one UE, a PRS request message, the transmitted PRS request message may include one or more parameters including at least one of: an SL ranging protocol version, one or more supported PRS channels, a supported per-channel PRS bandwidth, an initiator UE-assigned PRS Tx time, or a post-PRS Tx time (e.g., the PRS request component 1642 and/or the transmission component 1634). The apparatus 1602 includes means for receiving, from the at least one UE, a PRS response message based on the transmitted PRS request message (e.g., the PRS response process component 1644 and/or the reception component 1630). The apparatus 1602 includes means for transmitting, to the at least one UE, a PRS confirmation message based on the received PRS response message, the transmitted PRS confirmation message may include one or more parameters including at least one of: the SL ranging protocol version, the one or more supported PRS channels, the supported per-channel PRS bandwidth, the initiator UE-assigned PRS Tx time, or the post-PRS Tx time (e.g., the PRS confirmation component 1646 and/or the transmission component 1634). The apparatus 1602 includes means for transmitting, to the at least one UE, one or more PRSs and means for receiving, from the at least one UE, one or more PRSs based at least in part on at least one of the transmitted PRS request message or the transmitted PRS confirmation message (e.g., the PRS process component 1648, the reception component 1630, and/or the transmission component 1634). The apparatus 1602 includes means for transmitting, to the at least one UE, a post-PRS message and means for receiving, from the at least one UE, a post-PRS message based on the transmitted one or more PRSs and the received one or more PRSs, where each of the transmitted post-PRS message and the received post-PRS message may include one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location (e.g., the post PRS message process component 1650, the reception component 1630, and/or the transmission component 1634).

In one configuration, if the capability message includes at least one of the SL ranging protocol version, the one or more supported PRS channels, or the supported per-channel PRS bandwidth, then the PRS request message may include at least one of the initiator UE-assigned PRS Tx time or the post-PRS Tx time, and may exclude at least one of the SL ranging protocol version, the one or more supported PRS channels, or the supported per-channel PRS bandwidth.

In one configuration, the apparatus 1602 includes means for determining a PRS Tx-Rx time difference based on a difference between a Tx time of the transmitted one or more PRSs and a Rx time of the received one or more PRSs. In such a configuration, the transmitted post-PRS message may include the PRS Tx-Rx time difference and the received post-PRS message may include a PRS Tx-Rx time difference determined by the at least one UE. In such a configuration, the apparatus 1602 includes means for determining an inter-UE RTT by adding the PRS Tx-Rx time difference in the transmitted post-PRS message and the PRS Tx-Rx time difference in the received post-PRS message, and the UE may estimate the UE's position or the UE's range with respect to the at least one UE based at least in part on the determined inter-UE RTT.

In one configuration, at least one of the transmitted post-PRS message or the received post-PRS message may include at least one of the UE velocity or the accuracy metric associated with the UE velocity. In such a configuration, the apparatus 1602 includes means for determining a first displacement of the UE between a first time and a second time based at least in part on the UE velocity at the first time, means for determining a second displacement of the UE between the second time and a third time based at least in part on the UE velocity at the second time, and means for estimating the UE's position with respect to the at least one UE based on the determined first displacement and the determined second displacement. In such a configuration, the at least one UE may be an RSU or may include an RSU.

In one configuration, at least one of the transmitted post-PRS message or the received post-PRS message may include at least one of the UE velocity, the accuracy metric associated with the UE velocity, the UE acceleration, or the accuracy metric associated with the UE acceleration. In such a configuration, the apparatus 1602 includes means for determining a first displacement of the UE between a first time and a second time based at least in part on the UE velocity and the UE acceleration at the first time, means for determining a second displacement of the UE between the second time and a third time based at least in part on the UE velocity and the UE acceleration at the second time, and means for estimating the UE's position with respect to the at least one UE based on the determined first displacement and the determined second displacement. In such a configuration, the at least one UE may be an RSU or may include an RSU.

In one configuration, the received post-PRS message may include an AoA of the transmitted one or more PRSs and the at least one UE may be at a fixed location. In such a configuration, the apparatus 1602 includes means for determining the UE's range with respect to the at least one UE based on the transmitted one or more PRSs and the received one or more PRSs, and means for estimating the UE's position based on the UE's range with respect to the at least one UE, the AoA of the transmitted one or more PRSs, and the fixed location of the at least one UE.

In one configuration, the received post-PRS message may include an AoD of the received one or more PRSs and the at least one UE may be at a fixed location. In such a configuration, the apparatus 1602 includes means for determining the UE's range with respect to the at least one UE based on the transmitted one or more PRSs and the received one or more PRSs, and means for estimating the UE's position based on the UE's range with respect to the at least one UE, the AoD of the received one or more PRSs, and the fixed location of the at least one UE.

In one configuration, the received post-PRS message may include a UE antenna ID and a UE antenna location for each of a plurality of antennas at the at least one UE. In such a configuration, the apparatus 1602 includes means for transmitting, to each of the plurality of antennas, one or more PRSs and means for receiving, from each of the plurality of antennas, one or more PRSs based on the UE antenna ID associated with each of the plurality of antennas, means for calculating a range between the UE and each of the plurality of antennas based on the one or more PRSs transmitted to each of the plurality of antennas and the one or more PRSs received from each of the plurality of antennas, and means for estimating the UE's position or the UE's range with respect to the at least one UE based on the calculated ranges between the UE and each of the plurality of antennas and based on the UE antenna location associated with each of the plurality of antennas.

In one configuration, the transmitted post-PRS message may include the UE antenna ID and the UE antenna location for each of a plurality of antennas at the UE. In such a configuration, the apparatus 1602 includes means for transmitting, to the at least one UE, one or more PRSs from each of the plurality of antennas and means for receiving, from the at least one UE, one or more PRSs at each of the plurality of antennas, means for calculating a range between each of the plurality of antennas and the at least one UE based on the one or more PRSs transmitted from each of the plurality of antennas and the one or more PRSs received at each of the plurality of antennas, and means for estimating the UE's position or the UE's range with respect to the at least one UE based on the calculated ranges between each of the plurality of antennas and the at least one UE.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 17 is a flowchart 1700 of a method of wireless communication. The method may be performed by a UE or a component of a UE (e.g., the UE 104, 350, 604, 704, 706, 708, 804, 1004, 1104, 1204, 1404; the apparatus 1802; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to establish one or more SL-based ranging and positioning sessions with one or more UEs.

At 1702, the UE may receive, from the at least one UE, a capability message, and transmit, to the at least one UE, a capability message, where each of the received capability message and the transmitted capability message may include one or more parameters including at least one of: the SL ranging protocol version, the one or more supported PRS channels, or the supported per-channel PRS bandwidth, such as described in connection with FIG. 8. For example, at 806, the second UE 804 may exchange a capability message 808 with the first UE 802, where the capability message 808 may include at least one of the SL ranging protocol version 840, the one or more supported PRS channels 842, and/or the supported per-channel PRS bandwidth 844. The transmission of the capability message and/or the reception of the capability message may be performed, e.g., by the capability message process component 1840, the reception component 1830, and/or the transmission component 1834 of the apparatus 1802 in FIG. 18.

At 1704, the UE may receive, from at least one UE, a PRS request message, the received PRS request message may include one or more parameters including at least one of: an SL ranging protocol version, one or more supported PRS channels, a supported per-channel PRS bandwidth, an initiator UE-assigned PRS Tx time, or a post-PRS Tx time, such as described in connection with FIG. 8. For example, at 810, the second UE 804 may receive a PRS request message 812 from the first UE 802, where the PRS request message 812 may include at least one of: an SL ranging protocol version 840, one or more supported PRS channels 842, a supported per-channel PRS bandwidth 844, an initiator UE-assigned PRS Tx time 846, or a post-PRS Tx time 848. The reception of the PRS request message may be performed, e.g., by the PRS request process component 1842 and/or the reception component 1830 of the apparatus 1802 in FIG. 18.

At 1706, the UE may transmit, to the at least one UE, a PRS response message based on the received PRS request message, such as described in connection with FIG. 8. For example, at 814, the second UE 804 may transmit a PRS response message 818 to the first UE 802 based on the received PRS request message 812. The transmission of the PRS response message may be performed, e.g., by the PRS response component 1844 and/or the transmission component 1834 of the apparatus 1802 in FIG. 18.

At 1708, the UE may receive, from the at least one UE, a PRS confirmation message based on the transmitted PRS response message, the received PRS confirmation message may include one or more parameters including at least one of: the SL ranging protocol version, the one or more supported PRS channels, the supported per-channel PRS bandwidth, the initiator UE-assigned PRS Tx time, or the post-PRS Tx time, such as described in connection with FIG. 8. For example, at 818, the second UE 804 may receive a PRS confirmation message 820 based on the transmitted PRS response message 818, where the received PRS confirmation message may include at least one of: the SL ranging protocol version 840, the one or more supported PRS channels 842, the supported per-channel PRS bandwidth 844, the initiator UE-assigned PRS Tx time 846, or the post-PRS Tx time 848. The reception of the PRS confirmation message may be performed, e.g., by the PRS confirmation process component 1846 and/or the reception component 1830 of the apparatus 1802 in FIG. 18.

In one example, if the capability message includes at least one of the SL ranging protocol version, the one or more supported PRS channels, or the supported per-channel PRS bandwidth, then the PRS request message may include at least one of the initiator UE-assigned PRS Tx time or the post-PRS Tx time, and may exclude at least one of the SL ranging protocol version, the one or more supported PRS channels, or the supported per-channel PRS bandwidth.

At 1710, the UE may receive, from the at least one UE, one or more PRSs and transmit, to the at least one UE, one or more PRSs based at least in part on at least one of the received PRS request message or the received PRS confirmation message, such as described in connection with FIG. 8. For example, at 822 and 826, the second UE 804 may receive, from the first UE 802, one or more PRSs 824 and transmit, to the first UE 802, one or more PRSs 828 based at least in part on at least one of the received PRS request message 812 or the received PRS confirmation message 820. The transmission of the one or more PRSs and/or the reception of the one or more PRSs may be performed, e.g., by the PRS process component 1848, the reception component 1830, and/or the transmission component 1834 of the apparatus 1802 in FIG. 18.

At 1712, the UE may receive, from the at least one UE, a post-PRS message and transmit, to the at least one UE, a post-PRS message based on the received one or more PRSs and the transmitted one or more PRSs, where each of the received post-PRS message and the transmitted post-PRS message may include one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location, such as described in connection with FIG. 8. For example, at 830 and 834, the second UE 804 may receive, from the first UE 802, a post-PRS message 832 and transmit, to the first UE 802, a post-PRS message 836 based on the received one or more PRSs 824 and the transmitted one or more PRSs 828, where each of the received post-PRS message 832 and the transmitted post-PRS message 836 may include at least one of: a PRS Tx-Rx time difference 850, a UE velocity 852, an accuracy metric associated with the UE velocity, a UE acceleration 854, an accuracy metric associated with the UE acceleration, an AoA 856, an AoD 858, a UE antenna ID 860, or a UE antenna location 862. The transmission of the post-PRS message and/or the reception of the post-PRS message may be performed, e.g., by the post PRS message process component 1850, the reception component 1830, and/or the transmission component 1834 of the apparatus 1802 in FIG. 18.

In one example, the UE may determine a PRS Tx-Rx time difference based on a difference between a Rx time of the received one or more PRSs and a Tx time of the transmitted one or more PRSs.

In one example, the received post-PRS message may include at least one of the UE velocity or the accuracy metric associated with the UE velocity. In such an example, the UE may determine a first displacement of the at least one UE between a first time and a second time based at least in part on the UE velocity of the at least one UE at the first time, determine a second displacement of the at least one UE between the second time and a third time based at least in part on the UE velocity of the at least one UE at the second time, and estimate the at least one UE's position with respect to the UE based on the determined first displacement and the determined second displacement. In such an example, the UE may be an RSU or includes an RSU.

In one example, the received post-PRS message may include at least one of the UE velocity, the accuracy metric associated with the UE velocity, the UE acceleration, or the accuracy metric associated with the UE acceleration. In such an example, the UE may determine a first displacement of the at least one UE between a first time and a second time based at least in part on the UE velocity and the UE acceleration of the at least one UE at the first time, determine a second displacement of the at least one UE between the second time and a third time based at least in part on the UE velocity and the UE acceleration of the at least one UE at the second time, and estimate the at least one UE's position with respect to the UE based on the determined first displacement and the determined second displacement. In such an example, the UE may be an RSU or includes an RSU.

In one example, the transmitted post-PRS message may include an AoA of the received one or more PRSs and the UE is at a fixed location. In another example, the transmitted post-PRS message may include an AoD of the transmitted one or more PRSs and the at least one UE is at a fixed location. In such an example, the UE may be aware of its location, and the UE may transmit its location to the at least one UE. As such, the at least one UE may determine the at least one UE's location with respect to the UE or the at least one UE's location (e.g., the at least one UE's absolute location, the at least one UE's approximate geographical location, a known location, etc.) based at least in part on the location of the UE and the AoD/AoA.

In one example, the transmitted post-PRS message may include a UE antenna ID and a UE antenna location for each of a plurality of antennas at the UE. In such an example, the UE may receive, at each of the plurality of antennas, one or more PRSs and transmit, from each of the plurality of antennas, one or more PRSs based on the UE antenna ID associated with each of the plurality of antennas.

In one example, the received post-PRS message may include the UE antenna ID and the UE antenna location for each of a plurality of antennas at the at least one UE. In such an example, the UE may receive, at the UE, one or more PRSs from each of the plurality of antennas and transmit, from the UE, one or more PRSs to each of the plurality of antennas.

Figure 18:
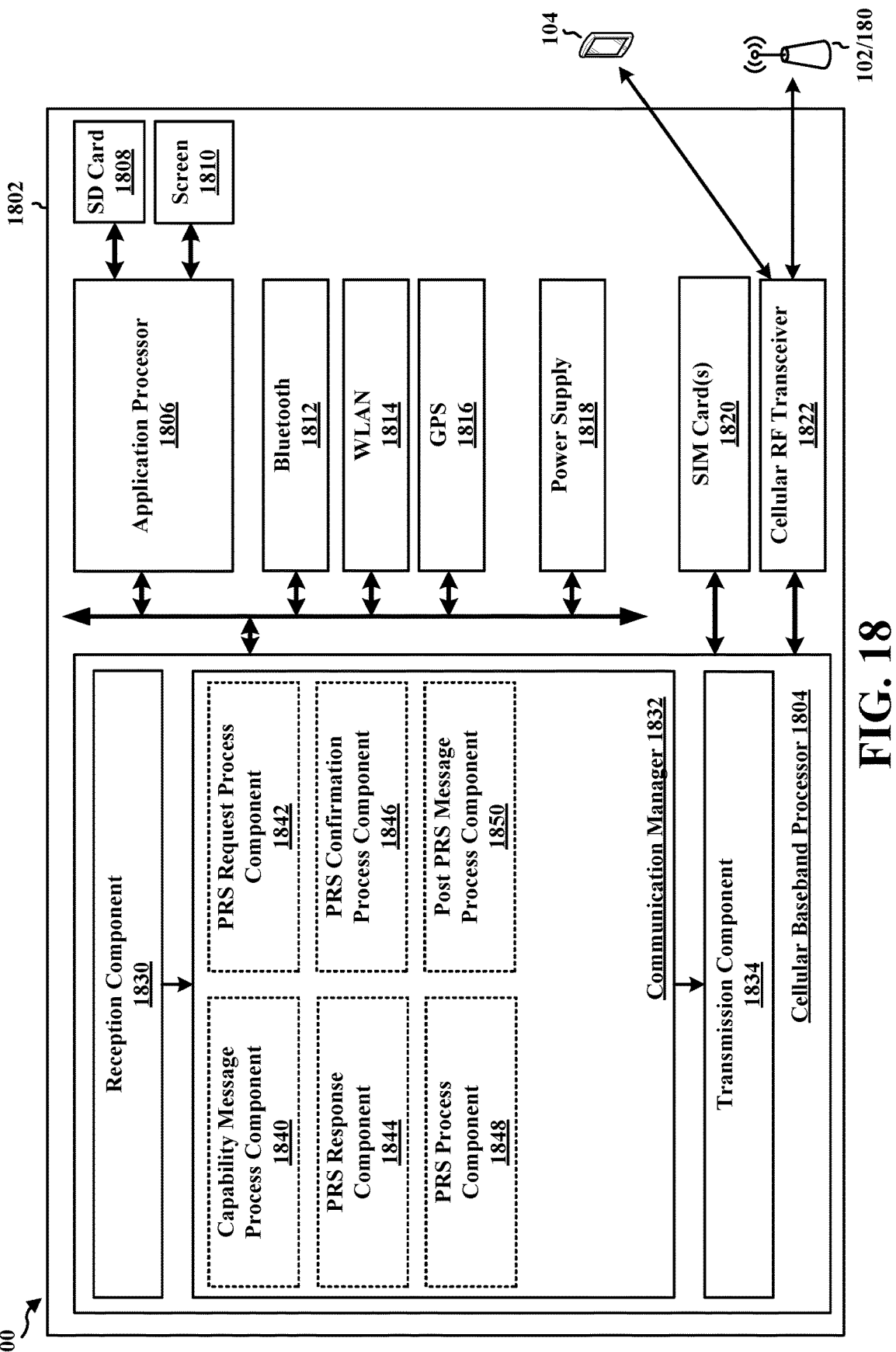
FIG. 18 is a diagram illustrating an example of a hardware implementation for an example apparatus in accordance with aspects presented herein.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the aforediscussed additional modules of the apparatus 1802.

The communication manager 1832 includes a capability message process component 1840 that is configured to receive, from the at least one UE, a capability message; and transmit, to the at least one UE, a capability message, where each of the received capability message and the transmitted capability message includes one or more parameters including at least one of: the SL ranging protocol version, the one or more supported PRS channels, or the supported per-channel PRS bandwidth, e.g., as described in connection with 1702 of FIG. 17. The communication manager 1832 further includes a PRS request process component 1842 that is configured to receive, from at least one UE, a PRS request message, the received PRS request message including one or more parameters including at least one of: an SL ranging protocol version, one or more supported PRS channels, a supported per-channel PRS bandwidth, an initiator UE-assigned PRS Tx time, or a post-PRS Tx time, e.g., as described in connection with 1704 of FIG. 17. The communication manager 1832 further includes a PRS response component 1844 that is configured to transmit, to the at least one UE, a PRS response message based on the received PRS request message, e.g., as described in connection with 1706 of FIG. 17. The communication manager 1832 further includes a PRS confirmation process component 1846 that is configured to receive, from the at least one UE, a PRS confirmation message based on the transmitted PRS response message, the received PRS confirmation message including one or more parameters including at least one of: the SL ranging protocol version, the one or more supported PRS channels, the supported per-channel PRS bandwidth, the initiator UE-assigned PRS Tx time, or the post-PRS Tx time, e.g., as described in connection with 1708 of FIG. 17. The communication manager 1832 further includes a PRS process component 1848 that is configured to receive, from the at least one UE, one or more PRSs and transmit, to the at least one UE, one or more PRSs based at least in part on at least one of the received PRS request message or the received PRS confirmation message, e.g., as described in connection with 1710 of FIG. 17. The communication manager 1832 further includes a post PRS message process component 1850 that is configured to receive, from the at least one UE, a post-PRS message and transmit, to the at least one UE, a post-PRS message based on the received one or more PRSs and the transmitted one or more PRSs, where each of the received post-PRS message and the transmitted post-PRS message includes one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location, e.g., as described in connection with 1712 of FIG. 17.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for receiving, from the at least one UE, a capability message, and means for transmitting, to the at least one UE, a capability message, where each of the received capability message and the transmitted capability message includes one or more parameters including at least one of: the SL ranging protocol version, the one or more supported PRS channels, or the supported per-channel PRS bandwidth (e.g., the capability message process component 1840, the reception component 1830, and/or the transmission component 1834). The apparatus 1802 includes means for receiving, from at least one UE, a PRS request message, the received PRS request message may include one or more parameters including at least one of: an SL ranging protocol version, one or more supported PRS channels, a supported per-channel PRS bandwidth, an initiator UE-assigned PRS Tx time, or a post-PRS Tx time (e.g., the PRS request process component 1842 and/or the reception component 1830). The apparatus 1802 includes means for transmitting, to the at least one UE, a PRS response message based on the received PRS request message (e.g., the PRS response component 1844 and/or the transmission component 1834). The apparatus 1802 includes means for receiving, from the at least one UE, a PRS confirmation message based on the transmitted PRS response message, the received PRS confirmation message may include one or more parameters including at least one of: the SL ranging protocol version, the one or more supported PRS channels, the supported per-channel PRS bandwidth, the initiator UE-assigned PRS Tx time, or the post-PRS Tx time (e.g., the PRS confirmation process component 1846 and/or the reception component 1830). The apparatus 1802 includes means for receiving, from the at least one UE, one or more PRSs and means for transmitting, to the at least one UE, one or more PRSs based at least in part on at least one of the received PRS request message or the received PRS confirmation message (e.g., the PRS process component 1848, the reception component 1830, and/or the transmission component 1834). The apparatus 1802 includes means for receiving, from the at least one UE, a post-PRS message and means for transmitting, to the at least one UE, a post-PRS message based on the received one or more PRSs and the transmitted one or more PRSs, where each of the received post-PRS message and the transmitted post-PRS message may include one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location (e.g., the post PRS message process component 1850, the reception component 1830, and/or the transmission component 1834).

In one configuration, if the capability message includes at least one of the SL ranging protocol version, the one or more supported PRS channels, or the supported per-channel PRS bandwidth, then the PRS request message may include at least one of the initiator UE-assigned PRS Tx time or the post-PRS Tx time, and may exclude at least one of the SL ranging protocol version, the one or more supported PRS channels, or the supported per-channel PRS bandwidth.

In one configuration, the apparatus 1802 includes means for determining a PRS Tx-Rx time difference based on a difference between a Rx time of the received one or more PRSs and a Tx time of the transmitted one or more PRSs.

In one configuration, the received post-PRS message may include at least one of the UE velocity or the accuracy metric associated with the UE velocity. In such a configuration, the apparatus 1802 includes means for determining a first displacement of the at least one UE between a first time and a second time based at least in part on the UE velocity of the at least one UE at the first time, means for determining a second displacement of the at least one UE between the second time and a third time based at least in part on the UE velocity of the at least one UE at the second time, and means for estimating the at least one UE's position with respect to the UE based on the determined first displacement and the determined second displacement. In such a configuration, the UE may be an RSU or includes an RSU.

In one configuration, the received post-PRS message may include at least one of the UE velocity, the accuracy metric associated with the UE velocity, the UE acceleration, or the accuracy metric associated with the UE acceleration. In such a configuration, the apparatus 1802 includes means for determining a first displacement of the at least one UE between a first time and a second time based at least in part on the UE velocity and the UE acceleration of the at least one UE at the first time, means for determining a second displacement of the at least one UE between the second time and a third time based at least in part on the UE velocity and the UE acceleration of the at least one UE at the second time, and means for estimating the at least one UE's position with respect to the UE based on the determined first displacement and the determined second displacement. In such a configuration, the UE may be an RSU or includes an RSU.

In one configuration, the transmitted post-PRS message may include an AoA of the received one or more PRSs and the UE is at a fixed location. In another configuration, the transmitted post-PRS message may include an AoD of the transmitted one or more PRSs and the at least one UE is at a fixed location.

In one configuration, the transmitted post-PRS message may include a UE antenna ID and a UE antenna location for each of a plurality of antennas at the UE. In such a configuration, the apparatus 1802 includes means for receiving, at each of the plurality of antennas, one or more PRSs and transmit, from each of the plurality of antennas, one or more PRSs based on the UE antenna ID associated with each of the plurality of antennas.

In one configuration, the received post-PRS message may include the UE antenna ID and the UE antenna location for each of a plurality of antennas at the at least one UE. In such a configuration, the apparatus 1802 includes means for receiving, at the UE, one or more PRSs from each of the plurality of antennas and transmit, from the UE, one or more PRSs to each of the plurality of antennas.

The aforementioned means may be one or more of the aforementioned components of the apparatus 1802 configured to perform the functions recited by the aforementioned means. As described supra, the apparatus 1802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples set forth additional aspects and are illustrative only and aspects thereof may be combined with aspects of other embodiments or teaching described herein, without limitation.

Aspect 1 is an apparatus for wireless communication at a UE, comprising: a memory; a transceiver; and a processor, communicatively connected to the memory and the transceiver, the processor configured to: transmit, to at least one UE, a PRS request message, the transmitted PRS request message including one or more parameters including at least one of: an SL ranging protocol version, one or more supported PRS channels, a supported per-channel PRS bandwidth, an initiator UE-assigned PRS Tx time, or a post-PRS Tx time; receive, from the at least one UE, a PRS response message based on the transmitted PRS request message; and transmit, to the at least one UE, a PRS confirmation message based on the received PRS response message, the transmitted PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

In aspect 2, the apparatus of aspect 1 further includes that the processor is further configured to: transmit, to the at least one UE, a capability message; and receive, from the at least one UE, a capability message, where each of the transmitted capability message and the received capability message includes one or more parameters including at least one of: the SL ranging protocol version, the one or more supported PRS channels, or the supported per-channel PRS bandwidth.

In aspect 3, the apparatus of aspect 1 or aspect 2 further includes that the PRS request message includes at least one of the initiator UE-assigned PRS Tx time or the post-PRS Tx time, and excludes at least one of the SL ranging protocol version, the one or more supported PRS channels, or the supported per-channel PRS bandwidth.

In aspect 4, the apparatus of any of aspects 1-3 further includes that the processor is further configured to: transmit, to the at least one UE, one or more PRSs and receive, from the at least one UE, one or more PRSs based at least in part on at least one of the transmitted PRS request message or the transmitted PRS confirmation message; and transmit, to the at least one UE, a post-PRS message and receive, from the at least one UE, a post-PRS message based on the transmitted one or more PRSs and the received one or more PRSs, where each of the transmitted post-PRS message and the received post-PRS message includes one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location.

In aspect 5, the apparatus of any of aspects 1-4 further includes that the processor is further configured to: determine a PRS Tx-Rx time difference based on a difference between a Tx time of the transmitted one or more PRSs and a Rx time of the received one or more PRSs.

In aspect 6, the apparatus of any of aspects 1-5 further includes that the processor is further configured to: receive, from the at least one UE, a location of the at least one UE; and determine the UE's location with respect to the at least one UE or a location of the UE based at least in part on the location of the at least one UE.

In aspect 7, the apparatus of any of aspects 1-6 further includes that at least one of the transmitted post-PRS message or the received post-PRS message includes at least one of the UE velocity or the accuracy metric associated with the UE velocity.

In aspect 8, the apparatus of any of aspects 1-7 further includes that the processor is further configured to: determine a first displacement of the UE between a first time and a second time based at least in part on the UE velocity at the first time; determine a second displacement of the UE between the second time and a third time based at least in part on the UE velocity at the second time; and estimate the UE's position with respect to the at least one UE based on the determined first displacement and the determined second displacement.

In aspect 9, the apparatus of any of aspects 1-8 further includes that at least one of the transmitted post-PRS message or the received post-PRS message includes at least one of the UE velocity, the accuracy metric associated with the UE velocity, the UE acceleration, or the accuracy metric associated with the UE acceleration.

In aspect 10, the apparatus of any of aspects 1-9 further includes that the processor is further configured to: determine a first displacement of the UE between a first time and a second time based at least in part on the UE velocity and the UE acceleration at the first time; determine a second displacement of the UE between the second time and a third time based at least in part on the UE velocity and the UE acceleration at the second time; and estimate the UE's position with respect to the at least one UE based on the determined first displacement and the determined second displacement.

In aspect 11, the apparatus of any of aspects 1-10 further includes that the at least one UE is an RSU or includes an RSU.

In aspect 12, the apparatus of any of aspects 1-11 further includes that the received post-PRS message includes an AoA of the transmitted one or more PRSs and the at least one UE is at a fixed location, the processor being further configured to: determine the UE's range with respect to the at least one UE based on the transmitted one or more PRSs and the received one or more PRSs; and estimate the UE's position based on the UE's range with respect to the at least one UE, the AoA of the transmitted one or more PRSs, and the fixed location of the at least one UE.

In aspect 13, the apparatus of any of aspects 1-12 further includes that the received post-PRS message includes an AoD of the received one or more PRSs and the at least one UE is at a fixed location, the processor being further configured to: determine the UE's range with respect to the at least one UE based on the transmitted one or more PRSs and the received one or more PRSs; and estimate the UE's position based on the UE's range with respect to the at least one UE, the AoD of the received one or more PRSs, and the fixed location of the at least one UE.

In aspect 14, the apparatus of any of aspects 1-13 further includes that the received post-PRS message includes a UE antenna ID and a UE antenna location for each of a plurality of antennas at the at least one UE, the processor being further configured to: transmit, to each of the plurality of antennas, one or more PRSs and receive, from each of the plurality of antennas, one or more PRSs based on the UE antenna ID associated with each of the plurality of antennas; calculate a range between the UE and each of the plurality of antennas based on the one or more PRSs transmitted to each of the plurality of antennas and the one or more PRSs received from each of the plurality of antennas; and estimate the UE's position or the UE's range with respect to the at least one UE based on the calculated ranges between the UE and each of the plurality of antennas and based on the UE antenna location associated with each of the plurality of antennas.

In aspect 15, the apparatus of any of aspects 1-14 further includes that the transmitted post-PRS message includes the UE antenna ID and the UE antenna location for each of a plurality of antennas at the UE, the processor being further configured to: transmit, to the at least one UE, one or more PRSs from each of the plurality of antennas and receive, from the at least one UE, one or more PRSs at each of the plurality of antennas; calculate a range between each of the plurality of antennas and the at least one UE based on the one or more PRSs transmitted from each of the plurality of antennas and the one or more PRSs received at each of the plurality of antennas; and estimate the UE's position or the UE's range with respect to the at least one UE based on the calculated ranges between each of the plurality of antennas and the at least one UE.

Aspect 16 is a method of wireless communication at a UE, comprising: transmitting, to at least one UE, a PRS request message, the transmitted PRS request message including one or more parameters including at least one of: an SL ranging protocol version, one or more supported PRS channels, a supported per-channel PRS bandwidth, an initiator UE-assigned PRS Tx time, or a post-PRS Tx time; receiving, from the at least one UE, a PRS response message based on the transmitted PRS request message; and transmitting, to the at least one UE, a PRS confirmation message based on the received PRS response message, the transmitted PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

In aspect 17, the method of aspect 16 further comprises: transmitting, to the at least one UE, a capability message; and receiving, from the at least one UE, a capability message, where each of the transmitted capability message and the received capability message includes one or more parameters including at least one of: the SL ranging protocol version, the one or more supported PRS channels, or the supported per-channel PRS bandwidth.

In aspect 18, the method of aspect 16 or aspect 17 further includes that the PRS request message includes at least one of the initiator UE-assigned PRS Tx time or the post-PRS Tx time, and excludes at least one of the SL ranging protocol version, the one or more supported PRS channels, or the supported per-channel PRS bandwidth.

In aspect 19, the method of any of aspects 16-18 further comprises: transmitting, to the at least one UE, one or more PRSs and receiving, from the at least one UE, one or more PRSs based at least in part on at least one of the transmitted PRS request message or the transmitted PRS confirmation message; and transmitting, to the at least one UE, a post-PRS message and receiving, from the at least one UE, a post-PRS message based on the transmitted one or more PRSs and the received one or more PRSs, where each of the transmitted post-PRS message and the received post-PRS message includes one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location.

In aspect 20, the method of any of aspects 16-19 further comprises: determining a PRS Tx-Rx time difference based on a difference between a Tx time of the transmitted one or more PRSs and a Rx time of the received one or more PRSs.

In aspect 21, the method of any of aspects 16-20 further comprises: receiving, from the at least one UE, a position of the at least one UE; and determining the UE's location with respect to the at least one UE or a location of the UE based at least in part on the location of the at least one UE.

In aspect 22, the method of any of aspects 16-21 further includes that at least one of the transmitted post-PRS message or the received post-PRS message includes at least one of the UE velocity or the accuracy metric associated with the UE velocity.

In aspect 23, the method of any of aspects 16-22 further comprises: determining a first displacement of the UE between a first time and a second time based at least in part on the UE velocity at the first time; determining a second displacement of the UE between the second time and a third time based at least in part on the UE velocity at the second time; and estimating the UE's position with respect to the at least one UE based on the determined first displacement and the determined second displacement.

In aspect 24, the method of any of aspects 16-23 further includes that at least one of the transmitted post-PRS message or the received post-PRS message includes at least one of the UE velocity, the accuracy metric associated with the UE velocity, the UE acceleration, or the accuracy metric associated with the UE acceleration.

In aspect 25, the method of any of aspects 16-24 further comprises: determining a first displacement of the UE between a first time and a second time based at least in part on the UE velocity and the UE acceleration at the first time; determining a second displacement of the UE between the second time and a third time based at least in part on the UE velocity and the UE acceleration at the second time; and estimating the UE's position with respect to the at least one UE based on the determined first displacement and the determined second displacement.

In aspect 26, the method of any of aspects 16-25 further includes that the at least one UE is an RSU or includes an RSU.

In aspect 27, the method of any of aspects 16-26 further includes that the received post-PRS message includes an AoA of the transmitted one or more PRSs and the at least one UE is at a fixed location, the method further comprises: determining the UE's range with respect to the at least one UE based on the transmitted one or more PRSs and the received one or more PRSs; and estimating the UE's position based on the UE's range with respect to the at least one UE, the AoA of the transmitted one or more PRSs, and the fixed location of the at least one UE.

In aspect 28, the method of any of aspects 16-27 further includes that the received post-PRS message includes an AoD of the received one or more PRSs and the at least one UE is at a fixed location, the method further comprises: determining the UE's range with respect to the at least one UE based on the transmitted one or more PRSs and the received one or more PRSs; and estimating the UE's position based on the UE's range with respect to the at least one UE, the AoD of the received one or more PRSs, and the fixed location of the at least one UE.

In aspect 29, the method of any of aspects 16-28 further includes that the received post-PRS message includes a UE antenna ID and a UE antenna location for each of a plurality of antennas at the at least one UE, the method further comprises: transmitting, to each of the plurality of antennas, one or more PRSs and receive, from each of the plurality of antennas, one or more PRSs based on the UE antenna ID associated with each of the plurality of antennas; calculating a range between the UE and each of the plurality of antennas based on the one or more PRSs transmitted to each of the plurality of antennas and the one or more PRSs received from each of the plurality of antennas; and estimating the UE's position or the UE's range with respect to the at least one UE based on the calculated ranges between the UE and each of the plurality of antennas and based on the UE antenna location associated with each of the plurality of antennas.

In aspect 30, the method of any of aspects 16-29 further includes that the transmitted post-PRS message includes the UE antenna ID and the UE antenna location for each of a plurality of antennas at the UE, the method further comprises: transmitting, to the at least one UE, one or more PRSs from each of the plurality of antennas and receive, from the at least one UE, one or more PRSs at each of the plurality of antennas; calculating a range between each of the plurality of antennas and the at least one UE based on the one or more PRSs transmitted from each of the plurality of antennas and the one or more PRSs received at each of the plurality of antennas; and estimating the UE's position or the UE's range with respect to the at least one UE based on the calculated ranges between each of the plurality of antennas and the at least one UE.

Aspect 31 is an apparatus for wireless communication including means for implementing a method as in any of aspects 16-30.

Aspect 32 is a non-transitory computer-readable medium storing computer executable code, where the code when executed by a processor causes the processor to implement a method as in any of aspects 16-30.

Aspect 33 is an apparatus for wireless communication at a UE, comprising: a memory; a transceiver; and a processor, communicatively connected to the memory and the transceiver, the processor configured to: receive, from at least one UE, a PRS request message, the received PRS request message including one or more parameters including at least one of: an SL ranging protocol version, one or more supported PRS channels, a supported per-channel PRS bandwidth, an initiator UE-assigned PRS Tx time, or a post-PRS Tx time; transmit, to the at least one UE, a PRS response message based on the received PRS request message; and receive, from the at least one UE, a PRS confirmation message based on the transmitted PRS response message, the received PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

In aspect 34, the apparatus of aspect 33 further includes that the processor is further configured to: receive, from the at least one UE, a capability message; and transmit, to the at least one UE, a capability message, where each of the received capability message and the transmitted capability message includes one or more parameters including at least one of: the SL ranging protocol version, the one or more supported PRS channels, or the supported per-channel PRS bandwidth.

In aspect 35, the apparatus of aspect 33 or aspect 34 further includes that the PRS request message includes at least one of the initiator UE-assigned PRS Tx time or the post-PRS Tx time, and excludes at least one of the SL ranging protocol version, the one or more supported PRS channels, or the supported per-channel PRS bandwidth.

In aspect 36, the apparatus of any of aspects 33-35 further includes that the processor is further configured to: receive, from the at least one UE, one or more PRSs and transmit, to the at least one UE, one or more PRSs based at least in part on at least one of the received PRS request message or the received PRS confirmation message; and receive, from the at least one UE, a post-PRS message and transmit, to the at least one UE, a post-PRS message based on the received one or more PRSs and the transmitted one or more PRSs, where each of the received post-PRS message and the transmitted post-PRS message includes one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location.

In aspect 37, the apparatus of any of aspects 33-36 further includes that the processor is further configured to: determine a PRS Tx-Rx time difference based on a difference between a Rx time of the received one or more PRSs and a Tx time of the transmitted one or more PRSs.

In aspect 38, the apparatus of any of aspects 33-37 further includes that the received post-PRS message includes at least one of the UE velocity or the accuracy metric associated with the UE velocity.

In aspect 39, the apparatus of any of aspects 33-38 further includes that the processor is further configured to: determine a first displacement of the at least one UE between a first time and a second time based at least in part on the UE velocity of the at least one UE at the first time; determine a second displacement of the at least one UE between the second time and a third time based at least in part on the UE velocity of the at least one UE at the second time; and estimate the at least one UE's position with respect to the UE based on the determined first displacement and the determined second displacement.

In aspect 40, the apparatus of any of aspects 33-39 further includes that the received post-PRS message includes at least one of the UE velocity, the accuracy metric associated with the UE velocity, the UE acceleration, or the accuracy metric associated with the UE acceleration.

In aspect 41, the apparatus of any of aspects 33-40 further includes that the processor is further configured to: determine a first displacement of the at least one UE between a first time and a second time based at least in part on the UE velocity and the UE acceleration of the at least one UE at the first time; determine a second displacement of the at least one UE between the second time and a third time based at least in part on the UE velocity and the UE acceleration of the at least one UE at the second time; and estimate the at least one UE's position with respect to the UE based on the determined first displacement and the determined second displacement.

In aspect 42, the apparatus of any of aspects 33-41 further includes that the UE includes an RSU.

In aspect 43, the apparatus of any of aspects 33-42 further includes that the transmitted post-PRS message includes an AoA of the received one or more PRSs and the UE is at a fixed location.

In aspect 44, the apparatus of any of aspects 33-43 further includes that the transmitted post-PRS message includes an AoD of the transmitted one or more PRSs and the at least one UE is at a fixed location.

In aspect 45, the apparatus of any of aspects 33-44 further includes that the transmitted post-PRS message includes a UE antenna ID and a UE antenna location for each of a plurality of antennas at the UE, the processor being further configured to: receive, at each of the plurality of antennas, one or more PRSs and transmit, from each of the plurality of antennas, one or more PRSs based on the UE antenna ID associated with each of the plurality of antennas.

In aspect 46, the apparatus of any of aspects 33-45 further includes that the received post-PRS message includes the UE antenna ID and the UE antenna location for each of a plurality of antennas at the at least one UE, the processor being further configured to: receive, at the UE, one or more PRSs from each of the plurality of antennas and transmit, from the UE, one or more PRSs to each of the plurality of antennas.

Aspect 47 is a method of wireless communication at a UE, comprising: receiving, from at least one UE, a PRS request message, the received PRS request message including one or more parameters including at least one of: an SL ranging protocol version, one or more supported PRS channels, a supported per-channel PRS bandwidth, an initiator UE-assigned PRS Tx time, or a post-PRS Tx time; transmitting, to the at least one UE, a PRS response message based on the received PRS request message; and receiving, from the at least one UE, a PRS confirmation message based on the transmitted PRS response message, the received PRS confirmation message including one or more parameters including at least one of: the SL ranging protocol version, the one or more supported PRS channels, the supported per-channel PRS bandwidth, the initiator UE-assigned PRS Tx time, or the post-PRS Tx time.

In aspect 48, the method of aspect 47 further comprises: receiving, from the at least one UE, a capability message; and transmitting, to the at least one UE, a capability message, where each of the received capability message and the transmitted capability message includes one or more parameters including at least one of: the SL ranging protocol version, the one or more supported PRS channels, or the supported per-channel PRS bandwidth.

In aspect 49, the method of aspect 47 or aspect 48 further includes that the PRS request message includes at least one of the initiator UE-assigned PRS Tx time or the post-PRS Tx time, and excludes at least one of the SL ranging protocol version, the one or more supported PRS channels, or the supported per-channel PRS bandwidth.

In aspect 50, the method of any of aspects 47-49 further comprises: receiving, from the at least one UE, one or more PRSs and transmitting, to the at least one UE, one or more PRSs based at least in part on at least one of the received PRS request message or the received PRS confirmation message; and receiving, from the at least one UE, a post-PRS message and transmitting, to the at least one UE, a post-PRS message based on the received one or more PRSs and the transmitted one or more PRSs, where each of the received post-PRS message and the transmitted post-PRS message includes one or more parameters including at least one of: a PRS Tx-Rx time difference, a UE velocity, an accuracy metric associated with the UE velocity, a UE acceleration, an accuracy metric associated with the UE acceleration, an AoA, an AoD, a UE antenna ID, or a UE antenna location.

In aspect 51, the method of any of aspects 47-50 further comprises: determining a PRS Tx-Rx time difference based on a difference between a Rx time of the received one or more PRSs and a Tx time of the transmitted one or more PRSs.

In aspect 52, the method of any of aspects 47-51 further includes that the received post-PRS message includes at least one of the UE velocity or the accuracy metric associated with the UE velocity.

In aspect 53, the method of any of aspects 47-52 further comprises: determining a first displacement of the at least one UE between a first time and a second time based at least in part on the UE velocity of the at least one UE at the first time; determining a second displacement of the at least one UE between the second time and a third time based at least in part on the UE velocity of the at least one UE at the second time; and estimating the at least one UE's position with respect to the UE based on the determined first displacement and the determined second displacement.

In aspect 54, the method of any of aspects 47-53 further includes that the received post-PRS message includes at least one of the UE velocity, the accuracy metric associated with the UE velocity, the UE acceleration, or the accuracy metric associated with the UE acceleration.

In aspect 55, the method of any of aspects 47-54 further comprises: determining a first displacement of the at least one UE between a first time and a second time based at least in part on the UE velocity and the UE acceleration of the at least one UE at the first time; determining a second displacement of the at least one UE between the second time and a third time based at least in part on the UE velocity and the UE acceleration of the at least one UE at the second time; and estimating the at least one UE's position with respect to the UE based on the determined first displacement and the determined second displacement.

In aspect 56, the method of any of aspects 47-55 further includes that the UE includes an RSU or is an RSU.

In aspect 57, the method of any of aspects 47-56 further includes that the transmitted post-PRS message includes an AoA of the received one or more PRSs and the UE is at a fixed location.

In aspect 58, the method of any of aspects 47-57 further includes that the transmitted post-PRS message includes an AoD of the transmitted one or more PRSs and the at least one UE is at a fixed location.

In aspect 59, the method of any of aspects 47-58 further includes that the transmitted post-PRS message includes a UE antenna ID and a UE antenna location for each of a plurality of antennas at the UE, the method further comprises: receiving, at each of the plurality of antennas, one or more PRSs and transmit, from each of the plurality of antennas, one or more PRSs based on the UE antenna ID associated with each of the plurality of antennas.

In aspect 60, the method of any of aspects 47-59 further includes that the received post-PRS message includes the UE antenna ID and the UE antenna location for each of a plurality of antennas at the at least one UE, the method further comprises: receiving, at the UE, one or more PRSs from each of the plurality of antennas and transmit, from the UE, one or more PRSs to each of the plurality of antennas.

Aspect 61 is an apparatus for wireless communication including means for implementing a method as in any of aspects 47-60.

Aspect 62 is a non-transitory computer-readable medium storing computer executable code, where the code when executed by a processor causes the processor to implement a method as in any of aspects 47-60.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), comprising:

at least one memory;

at least one transceiver; and at least one processor, communicatively connected to the at least one memory and the at least one transceiver, the at least one processor configured to:

transmit, to at least one second UE, a positioning reference signal (PRS) request message, the transmitted PRS request message including an initiator UE-assigned PRS transmission (Tx) time, a post-PRS Tx time, a sidelink (SL) ranging protocol version, one or more supported PRS channels, and a supported per-channel PRS bandwidth;

receive, from the at least one second UE, a PRS response message based on the transmitted PRS request message; and transmit, to the at least one second UE, a PRS confirmation message based on the received PRS response message, the transmitted PRS confirmation message including the initiator UE-assigned PRS Tx time, the post-PRS Tx time, the SL ranging protocol version, the one or more supported PRS channels, and the supported per-channel PRS bandwidth.

2. The apparatus of claim 1, wherein the at least one processor is further configured to:

transmit, to the at least one second UE, a first capability message; and receive, from the at least one second UE, a second capability message, wherein each of the transmitted capability message and the received capability message includes the SL ranging protocol version, the one or more supported PRS channels, and the supported per-channel PRS bandwidth.

3. The apparatus of claim 1, wherein the at least one processor is further configured to:

transmit, to the at least one second UE, a first set of PRSs and receive, from the at least one second UE, a second set of PRSs based at least in part on at least one of the transmitted PRS request message or the transmitted PRS confirmation message; and transmit, to the at least one second UE, a first post-PRS message and receive, from the at least one second UE, a second post-PRS message based on the transmitted first set of PRSs and the received second set of PRSs, wherein each of the transmitted post-PRS message and the received post-PRS message includes at least one of: a PRS transmission-reception (Tx-Rx) time difference, a UE velocity, a first accuracy metric associated with the UE velocity, a UE acceleration, a second accuracy metric associated with the UE acceleration, an angle-of-arrival (AoA), an angle-of-departure (AoD), a UE antenna identifier (ID), or a UE antenna location.

4. The apparatus of claim 3, wherein the at least one processor is further configured to:

determine a PRS Tx-Rx time difference based on a difference between a Tx time of the transmitted first set of PRSs and a Rx time of the received second set of PRSs.

5. The apparatus of claim 3, wherein at least one of the transmitted post-PRS message or the received post-PRS message includes at least one of the UE velocity or the accuracy metric associated with the UE velocity.

6. The apparatus of claim 3, wherein at least one of the transmitted post-PRS message or the received post-PRS message includes at least one of the UE velocity, the accuracy metric associated with the UE velocity, the UE acceleration, or the accuracy metric associated with the UE acceleration.

7. The apparatus of claim 3, wherein the at least one second UE is a roadside unit (RSU) or includes the RSU.

8. A method of wireless communication at a first user equipment (UE), comprising:

transmitting, to at least one second UE, a positioning reference signal (PRS) request message, the transmitted PRS request message including an initiator UE-assigned PRS transmission (Tx) time, a post-PRS Tx time, a sidelink (SL) ranging protocol version, one or more supported PRS channels, and a supported per-channel PRS bandwidth;

receiving, from the at least one second UE, a PRS response message based on the transmitted PRS request message; and transmitting, to the at least one second UE, a PRS confirmation message based on the received PRS response message, the transmitted PRS confirmation message including the initiator UE-assigned PRS Tx time, the post-PRS Tx time, the SL ranging protocol version, the one or more supported PRS channels, and the supported per-channel PRS bandwidth.

9. The method of claim 8, further comprising:

transmitting, to the at least one second UE, a first capability message; and receiving, from the at least one second UE, a second capability message, wherein each of the transmitted capability message and the received capability message includes the SL ranging protocol version, the one or more supported PRS channels, and the supported per-channel PRS bandwidth.

10. The method of claim 8, further comprising:

transmitting, to the at least one second UE, a first set of PRSs and receiving, from the at least one second UE, a second set of PRSs based at least in part on at least one of the transmitted PRS request message or the transmitted PRS confirmation message; and transmitting, to the at least one second UE, a first post-PRS message and receiving, from the at least one second UE, a second post-PRS message based on the transmitted first set of PRSs and the received second set of PRSs, wherein each of the transmitted post-PRS message and the received post-PRS message includes at least one of: a PRS transmission-reception (Tx-Rx) time difference, a UE velocity, a first accuracy metric associated with the UE velocity, a UE acceleration, a second accuracy metric associated with the UE acceleration, an angle-of-arrival (AoA), an angle-of-departure (AoD), a UE antenna identifier (ID), or a UE antenna location.

11. The method of claim 10, further comprising:

determining a PRS Tx-Rx time difference based on a difference between a Tx time of the transmitted first set of PRSs and a Rx time of the received second set of PRSs.

12. The method of claim 10, wherein at least one of the transmitted post-PRS message or the received post-PRS message includes at least one of the UE velocity or the accuracy metric associated with the UE velocity.

13. The method of claim 10, wherein at least one of the transmitted post-PRS message or the received post-PRS message includes at least one of the UE velocity, the accuracy metric associated with the UE velocity, the UE acceleration, or the accuracy metric associated with the UE acceleration.

14. The method of claim 10, wherein the at least one second UE is a roadside unit (RSU) or includes the RSU.

15. An apparatus for wireless communication at a second user equipment (UE), comprising:

at least one memory;

at least one transceiver; and at least one processor, communicatively connected to the at least one memory and the at least one transceiver, the at least one processor configured to:

receive, from a first UE, a positioning reference signal (PRS) request message, the received PRS request message including an initiator UE-assigned PRS transmission (Tx) time, a post-PRS Tx time, a sidelink (SL) ranging protocol version, one or more supported PRS channels, and a supported per-channel PRS bandwidth;

transmit, to the first UE, a PRS response message based on the received PRS request message; and receive, from the first UE, a PRS confirmation message based on the transmitted PRS response message, the received PRS confirmation message including the initiator UE-assigned PRS Tx time, the post-PRS Tx time, the SL ranging protocol version, the one or more supported PRS channels, and the supported per-channel PRS bandwidth.

16. The apparatus of claim 15, wherein the at least one processor is further configured to:

receive, from the first UE, a first capability message; and transmit, to the first UE, a second capability message, wherein each of the received capability message and the transmitted capability message includes the SL ranging protocol version, the one or more supported PRS channels, and the supported per-channel PRS bandwidth.

17. The apparatus of claim 15, wherein the at least one processor is further configured to:

receive, from the first UE, a first set of PRSs and transmit, to the first UE, a second set of PRSs based at least in part on at least one of the received PRS request message or the received PRS confirmation message; and receive, from the first UE, a first post-PRS message and transmit, to the first UE, a second post-PRS message based on the received first set of PRSs and the transmitted second set of PRSs, wherein each of the received post-PRS message and the transmitted post-PRS message includes at least one of: a PRS transmission-reception (Tx-Rx) time difference, a UE velocity, a first accuracy metric associated with the UE velocity, a UE acceleration, a second accuracy metric associated with the UE acceleration, an angle-of-arrival (AoA), an angle-of-departure (AoD), a UE antenna identifier (ID), or a UE antenna location.

18. The apparatus of claim 17, wherein the at least one processor is further configured to:

determine a PRS Tx-Rx time difference based on a difference between a Rx time of the received first set of PRSs and a Tx time of the transmitted second set of PRSs.

19. The apparatus of claim 17, wherein the received post-PRS message includes at least one of the UE velocity or the accuracy metric associated with the UE velocity.

20. The apparatus of claim 17, wherein the received post-PRS message includes at least one of the UE velocity, the accuracy metric associated with the UE velocity, the UE acceleration, or the accuracy metric associated with the UE acceleration.

21. The apparatus of claim 17, wherein the transmitted post-PRS message includes a second AoA of the received one or more PRSs and the UE is at a fixed location.

22. The apparatus of claim 17, wherein the transmitted post-PRS message includes a second AoD of the transmitted second set of PRSs and the UE is at a fixed location.

23. A method of wireless communication at a user equipment (UE), comprising:

receiving, from a first UE, a positioning reference signal (PRS) request message, the received PRS request message including an initiator UE-assigned PRS transmission (Tx) time, a post-PRS Tx time, a sidelink (SL) ranging protocol version, one or more supported PRS channels, and a supported per-channel PRS bandwidth;

transmitting, to the first UE, a PRS response message based on the received PRS request message; and receiving, from the first UE, a PRS confirmation message based on the transmitted PRS response message, the received PRS confirmation message including the initiator UE-assigned PRS Tx time, the post-PRS Tx time, the SL ranging protocol version, the one or more supported PRS channels, and the supported per-channel PRS bandwidth.

24. The method of claim 23, further comprising:

receiving, from the first UE, a first capability message; and transmitting, to the first UE, a second capability message, wherein each of the received capability message and the transmitted capability message includes the SL ranging protocol version, the one or more supported PRS channels, and the supported per-channel PRS bandwidth.

25. The method of claim 23, further comprising:

receiving, from the first UE, a first set of PRSs and transmitting, to the first UE, a second set of PRSs based at least in part on at least one of the received PRS request message or the received PRS confirmation message; and receiving, from the first UE, a first post-PRS message and transmitting, to the first UE, a second post-PRS message based on the received first set of PRSs and the transmitted second set of PRSs, wherein each of the received post-PRS message and the transmitted post-PRS message includes at least one of: a PRS transmission-reception (Tx-Rx) time difference, a UE velocity, a first accuracy metric associated with the UE velocity, a UE acceleration, a second accuracy metric associated with the UE acceleration, an angle-of-arrival (AoA), an angle-of-departure (AoD), a UE antenna identifier (ID), or a UE antenna location.

26. The method of claim 25, further comprising:

determining a PRS Tx-Rx time difference based on a difference between a Rx time of the received first set of PRSs and a Tx time of the transmitted second set of PRSs.

27. The method of claim 25, wherein the received post-PRS message includes at least one of the UE velocity or the accuracy metric associated with the UE velocity.

28. The method of claim 25, wherein the received post-PRS message includes at least one of the UE velocity, the accuracy metric associated with the UE velocity, the UE acceleration, or the accuracy metric associated with the UE acceleration.

29. The method of claim 25, wherein the transmitted post-PRS message includes a second AoA of the received first set of PRSs and the UE is at a fixed location.

30. The method of claim 25, wherein the transmitted post-PRS message includes a second AoD of the transmitted second set of PRSs and the UE is at a fixed location.

* * * * *